US011881889B2

(12) United States Patent
Kilian et al.

(10) Patent No.: US 11,881,889 B2
(45) Date of Patent: Jan. 23, 2024

(54) UNIPOLAR BINARY SEQUENCES WITH IMPROVED NON-PERIODIC CORRELATION BEHAVIOR FOR UNSYNCHRONIZED TSMA SYSTEMS

(71) Applicant: Fraunhofer-Gesellschaft zur Förderung der angewandten Forschung e.V., Munich (DE)

(72) Inventors: Gerd Kilian, Erlangen (DE); Josef Bernhard, Erlangen (DE); Johannes Wechsler, Erlangen (DE); Jakob Kneissl, Erlangen (DE); Raimund Meyer, Fürth (DE); Frank Obernosterer, Nuremberg (DE); Thomas Kauppert, Nuremberg (DE); Hristo Petkov, Nuremberg (DE)

(73) Assignees: FRAUNHOFER-GESELLSCHAFT ZUR FÖRDERUNG DER ANGEWANDTEN FORSCHUNG E.V., Munich (DE); DIEHL METERING GMBH, Ansbach (DE)

( * ) Notice: Subject to any disclaimer, the term of this patent is extended or adjusted under 35 U.S.C. 154(b) by 23 days.

(21) Appl. No.: 17/724,790

(22) Filed: Apr. 20, 2022

(65) Prior Publication Data

US 2022/0345177 A1    Oct. 27, 2022

Related U.S. Application Data

(63) Continuation of application No. PCT/EP2020/079662, filed on Oct. 21, 2020.

(30) Foreign Application Priority Data

Oct. 23, 2019   (DE) .......................... 102019216347.5

(51) Int. Cl.
 *H04B 1/71* (2011.01)
 *H04B 1/7143* (2011.01)
 (Continued)

(52) U.S. Cl.
 CPC ......... *H04B 1/7143* (2013.01); *H04B 1/7156* (2013.01); *H04L 5/0048* (2013.01); *H04B 2001/6908* (2013.01)

(58) Field of Classification Search
 CPC ................ H04B 1/7143; H04B 1/7156; H04B 2001/6908; H04B 1/713; H04L 5/0048
 See application file for complete search history.

(56) References Cited

U.S. PATENT DOCUMENTS 6,959,032 B1   10/2005 Richards et al.
11,431,464 B2 *  8/2022 Zhang ................ H04J 13/0062
(Continued)

FOREIGN PATENT DOCUMENTS

DE   10 2011 082 098 B4   4/2014
DE   10 2016 220 882 A1   4/2018
(Continued)

OTHER PUBLICATIONS

International Search Report and Written Opinion issued in application No. PCT/EP2020/079662 (dated Jul. 13, 2022).
(Continued)

*Primary Examiner* — Dac V Ha
(74) *Attorney, Agent, or Firm* — McClure, Qualey & Rodack, LLP

(57) ABSTRACT

Embodiments provide a method for generating a hopping pattern for transmitting a plurality of sub-data packets in a communication system. The method has a step of deriving a hopping pattern from a binary sequence, wherein an autocorrelation function of the binary sequence has autocorrelation side maximums with a predetermined maximum
(Continued)

value. The method further has a step of determining a maximum sub-data packet length for the plurality of sub-data packets in dependence on a total emission duration of the plurality of sub-data packets indicated by the hopping pattern, and a minimum value of a difference sequence of a sorted difference number series derived from the binary sequence.

20 Claims, 12 Drawing Sheets

(51) Int. Cl.
  *H04B 1/7156* (2011.01)
  *H04L 5/00* (2006.01)
  *H04B 1/69* (2011.01)

(56) References Cited

U.S. PATENT DOCUMENTS

| | | | |
|---|---|---|---|
| 2014/0176341 | A1 | 6/2014 | Bernhard et al. |
| 2018/0324868 | A1* | 11/2018 | Gaal ............... H04W 74/0833 |
| 2019/0253102 | A1 | 8/2019 | Kilian et al. |
| 2020/0003894 | A1* | 1/2020 | Giancristofaro ........ G01S 13/90 |
| 2020/0044687 | A1 | 2/2020 | Wechsler et al. |
| 2020/0177233 | A1 | 6/2020 | Kneissl et al. |
| 2023/0024735 | A1* | 1/2023 | Seller ................ H04B 1/7136 |

FOREIGN PATENT DOCUMENTS

| | | |
|---|---|---|
| DE | 10 2017 206 236 A1 | 10/2018 |
| DE | 10 2017 211 375 B3 | 12/2018 |
| WO | 2020/048869 A1 | 3/2020 |
| WO | 2020/127769 A2 | 6/2020 |
| WO | 2021/037737 A1 | 3/2021 |

OTHER PUBLICATIONS

Kilian, G., et al.; "Improved coverage for low-power telemetry systems using telegram splitting;" Proceedings of 2013 European Conference on Smart Objects, Systems and Technologies (SmartSysTech); Jun. 2013; pp. 1-6.
Kilian, G., et al.; "Increasing Transmission Reliability for Telemetry Systems Using Telegram Splitting;" IEEE Transactions on Communications; vol. 63; No. 3; Mar. 2015; pp. 949-961.
Baumert, L.D.; "Cyclic difference sets;" Springer-Verlag Berlin Heidelberg; 1971; pp. 150-151.
Lüke, H.D.; "Korrelationssignale: Korrelationsfolgen und Korrelationsarrays in Nachrichten—und Informationstechnik, Meßtechnik und Optik;" Deckblatt und Inhaltsverzeichnis; 1992; pp. 32-34.
International Search Report and Written Opinion issued in application No. PCT/EP2020/079662.
ETSI TS 103 357 V1.1.1; Short Range Devices; Low Throughput Networks (LTN); Protocols for radio interface A; Jun. 2018; pp. 1-113.
Lam, A.W.; "On optimum time-hopping patterns," IEEE Transactions on Communications, vol. 36, 1988, No. 3, pp. 380-382.
Aradhana, J., et al.; "Performance analysis of modified two dimensional Golomb code;" 2016 IEEE Annual India Conference (INDICON), IEEE; Dec. 2016; pp. 1-6.
Lam, A. W., et al.; "Time-Hopping and Frequency-Hopping Multiple-Access Packet Communications;" IEEE Transactions On Communications; vol. 38, No. 6, Jun. 1, 1990; pp. 875-888.
Li, B.; "One-Coincidence Sequences with Specified Distance Between Adjacent Symbols for Frequency-Hopping Multiple Access;" IEEE Transactions on Communications; vol. 45, No. 4; Apr. 1997; pp. 408-410.
Mendez, A.J., et al.; "Design and performance analysis of wavelength/time (W/T) matrix codes for optical CDMA;" Journal of Lightwave Technology; IEEE; vol. 21; No. 11; Nov. 2003; pp. 2524-2533.
Vishav, J., et al.; "Design and implementation of 2-dimensional wavelength/time codes for OCDMA;" vol. 122, No. 10; May 2010; pp. 851-857.

* cited by examiner

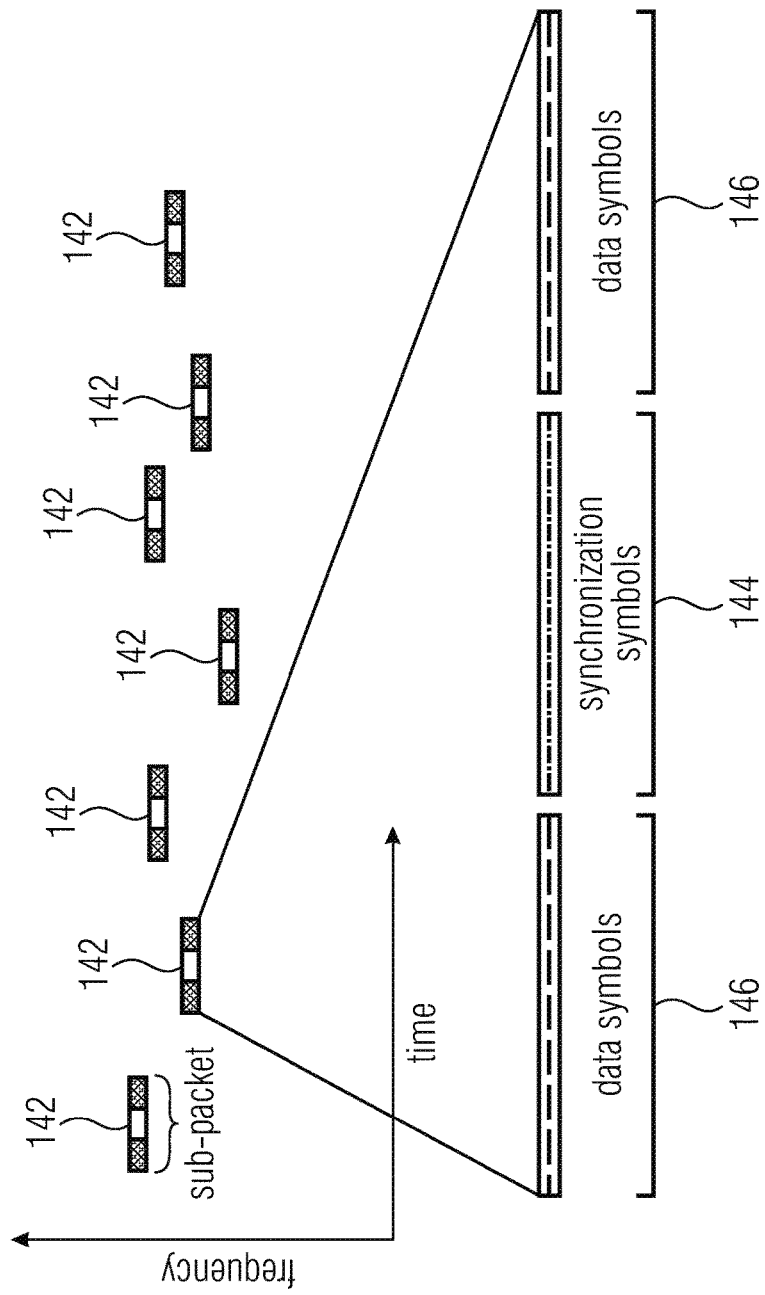
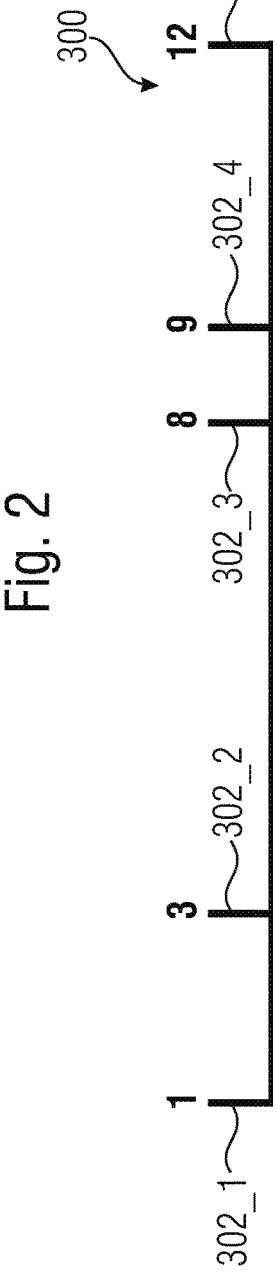
Fig. 2
Fig. 3

UNIPOLAR BINARY SEQUENCES WITH IMPROVED NON-PERIODIC CORRELATION BEHAVIOR FOR UNSYNCHRONIZED TSMA SYSTEMS

CROSS-REFERENCE TO RELATED APPLICATIONS

This application is a continuation of copending International Application No. PCT/EP2020/079662, filed Oct. 21, 2020, which is incorporated herein by reference in its entirety, and additionally claims priority from German Application No. 102019216347.5, filed Oct. 23, 2019, which is also incorporated herein by reference in its entirety.

TECHNICAL FIELD

Embodiments of the present invention relate to a data transmitter and, more particularly, to a data transmitter transmitting data using a hopping pattern. Further embodiments relate to a data receiver and, more particularly, to a data receiver receiving data transmitted using a hopping pattern. Some embodiments relate to a design of unipolar binary sequences with improved non-periodic correlation behavior for unsynchronized TSMA (telegram splitting multiple access) systems.

BACKGROUND OF THE INVENTION

The so-called telegram splitting method is known from [1], in which an encoded message (e.g. a data packet (e.g. of the physical layer)) is split onto a plurality of sub-data packets (or partial data packets), wherein the plurality of sub-data packets each comprise only a part of the encoded message, and wherein the plurality of sub-data packets are transmitted distributed in time and optionally in frequency according to a hopping pattern.

In [2], an improved coverage for telegram splitting-based LPWAN (Low Power Wide Area Network) systems is described.

In [3], improved transmission security for telegram splitting-based LPWAN systems is described.

In [9], an UNB (ultra-narrow band) LPWAN system based on the telegram splitting method is described.

In non-synchronized (asynchronous) LPWAN systems, such as those defined in [9], a large number of participants (e.g. sensor nodes) usually access the available frequency band simultaneously. This may lead to collisions between the transmissions of different nodes.

Therefore, the object underlying the present invention is reducing the probability of collision when a large number of subscribers simultaneously access the available frequency band.

SUMMARY

An embodiment may have a data transmitter of a communication system, wherein the communication system communicates wirelessly in a frequency band used for communication by a plurality of communication systems, the data transmitter being configured to split a data packet into a plurality of sub-data packets and to emit the plurality of sub-data packets in correspondence with a hopping pattern, wherein the hopping pattern is derived from a binary sequence, wherein an autocorrelation function of the binary sequence has autocorrelation side maximums with a predetermined maximum value, wherein a minimum total emission duration within which the plurality of sub-data packets are emitted, and/or a maximum length of the sub-data packets is/are dependent on a minimum value of a difference sequence of a sorted difference number series derived from the binary sequence.

Another embodiment may have a data receiver of a communication system, wherein the communication system communicates wirelessly in a frequency band used for communication by a plurality of communication systems, the data receiver being configured to receive a plurality of sub-data packets which are transmitted distributed in correspondence with a hopping pattern, and to combine the plurality of sub-data packets to obtain a data packet split onto the plurality of sub-data packets, wherein the hopping pattern is derived from a binary sequence, wherein an autocorrelation function of the binary sequence has autocorrelation side maximums with a predetermined maximum value, wherein a minimum total emission duration within which the plurality of sub-data packets are emitted, and/or a maximum length of the sub-data packets is/are dependent on a minimum value of a difference sequence of a sorted difference number series derived from the binary sequence.

Another embodiment may have a data transmitter, the data transmitter being configured to emit a signal in correspondence with a hopping pattern, wherein the hopping pattern is a time hopping pattern, a frequency hopping pattern or a combination of the time hopping pattern and the frequency hopping pattern, wherein the time hopping pattern is one of the nine time hopping patterns, mentioned in the table below, each having eight hops:

| | Difference to a respective directly preceding hop in multiples of $T_s$ | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 |
| 4 | 1904 | 2171 | 2459 | 2704 | 2971 | 3237 | 3504 |
| 5 | 3504 | 2459 | 2704 | 1904 | 2171 | 3237 | 2971 |
| 6 | 3504 | 2171 | 2704 | 1904 | 3237 | 2971 | 2459 |
| 7 | 756 | 688 | 823 | 892 | 621 | 552 | 406 |
| 8 | 553 | 484 | 756 | 892 | 823 | 688 | 542 |
| 9 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern has eight hops, wherein, in the table, each cell specifies a temporal distance of a reference point of the respective hop to an equal reference point of a directly preceding hop in symbol durations or multiples of symbol durations, wherein the frequency hopping pattern is one of the nine frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 |
| 4 | 0 | 9 | 18 | 3 | 12 | 21 | 6 | 15 |
| 5 | 4 | 10 | 22 | 16 | 7 | 19 | 13 | 1 |
| 6 | 23 | 14 | 17 | 8 | 20 | 11 | 5 | 2 |

-continued

| | Frequency channel numbers of the individual hops | | | | | | | |
|---|---|---|---|---|---|---|---|---|
| No. | 1 | 2 | 3 | 4 | 5 | 6 | 7 | 8 |
| 7 | 1 | 8 | 14 | 22 | 17 | 5 | 12 | 3 |
| 8 | 18 | 4 | 9 | 13 | 15 | 11 | 20 | 0 |
| 9 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Still another embodiment may have a data receiver, the data receiver being configured to receive a signal in correspondence with a hopping pattern, wherein the hopping pattern is a time hopping pattern, a frequency hopping pattern or a combination of the time hopping pattern and the frequency hopping pattern, wherein the time hopping pattern is one of the nine time hopping patterns, mentioned in the table below, each having eight hops:

| | Difference to a respective directly preceding hop in multiples of $T_s$ | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 |
| 4 | 1904 | 2171 | 2459 | 2704 | 2971 | 3237 | 3504 |
| 5 | 3504 | 2459 | 2704 | 1904 | 2171 | 3237 | 2971 |
| 6 | 3504 | 2171 | 2704 | 1904 | 3237 | 2971 | 2459 |
| 7 | 756 | 688 | 823 | 892 | 621 | 552 | 406 |
| 8 | 553 | 484 | 756 | 892 | 823 | 688 | 542 |
| 9 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern has eight hops, wherein, in the table, each cell specifies a temporal distance of a reference point of the respective hop to an equal reference point of a directly preceding hop in symbol durations or multiples of symbol durations, wherein the frequency hopping pattern is one of the nine frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 |
| 4 | 0 | 9 | 18 | 3 | 12 | 21 | 6 | 15 |
| 5 | 4 | 10 | 22 | 16 | 7 | 19 | 13 | 1 |
| 6 | 23 | 14 | 17 | 8 | 20 | 11 | 5 | 2 |
| 7 | 1 | 8 | 14 | 22 | 17 | 5 | 12 | 3 |
| 8 | 18 | 4 | 9 | 13 | 15 | 11 | 20 | 0 |
| 9 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Embodiments provide a data transmitter of a communication system, wherein the communication system communicates wirelessly in a frequency band used for communication by a plurality of communication systems, the data transmitter being configured to split a data packet into a plurality of sub-data packets and to emit the plurality of sub-data packets in correspondence with a hopping pattern [time and/or frequency hopping pattern, for example], wherein the hopping pattern is derived from a [unipolar, for example] binary sequence, wherein an autocorrelation function of the binary sequence comprises autocorrelation side maximums with a predetermined maximum value [$\lambda=1$ or $\lambda=2$, for example] [or, for example, wherein autocorrelation side values of an autocorrelation function of the binary sequence take values of at most one or two], wherein a minimum total emission duration within which the plurality of sub-data packets are emitted, and/or a maximum length of the sub-data packets is/are dependent on a minimum value of a difference sequence of a sorted difference number series derived from the binary sequence [such that autocorrelation side maximums of an autocorrelation function of the emission of the plurality of sub-data packets comprise the same maximum value as the autocorrelation side maximums of the autocorrelation function of the binary sequence, for example, or such that autocorrelation side values of an autocorrelation function of the hopping pattern take values of at most one or two, for example].

In embodiments, the difference number series can indicate or specify [in a predetermined order [in ascending or descending order, for example]] all the distances between all the elements [digits, for example] of the binary sequence having a predetermined logical value [for example a first logical value, for example, like logic one, 1], wherein the difference sequence indicates all the differences between directly neighboring values of the difference number series.

In embodiments, the binary sequence can map, or map at least partly, a Golomb ruler, a mirrored version of a Golomb ruler or a Barker sequence.

In embodiments, autocorrelation side maximums of an autocorrelation function of the emission of the plurality of sub-data packets can comprise the same maximum value as the autocorrelation side maximums of the autocorrelation function of the binary sequence.

In embodiments, one element among
  the minimum total emission duration and
  the maximum length of the sub-data packets may depend on
  a symbol duration,
  a number of sub-data packets,
  the minimum value of the difference sequence of the sorted difference number series, and
  the other element among the total emission duration and the length of the sub-data packets [such that autocorrelation side maximums of an autocorrelation function of the emission of the plurality of sub-data packets comprise the same maximum values as the autocorrelation side maximums of the autocorrelation function of the binary sequence, for example].

In embodiments, the dependence of the maximum length $X_{SP}$ of the sub-data packets on the symbol duration $T_S$, the number $N$ of sub-data packets and the total emission duration $T_{GSD}$ can be based on the following formula:

$$X_{SP} < \frac{1}{2}\min(\mathit{Diff}_{\mathit{Diff}_G}) \cdot \frac{T_{GSD}}{T_S \cdot N},$$

wherein min(Diff$_{Diff_G}$) describes the minimum value of the difference sequence of the sorted difference number series.

In embodiments, the dependence of the minimum total emission duration $T_{GSD}$ on the symbol duration $T_S$, the number of N of sub-data packets and the maximum length $X_{SP}$ of the sub-data packets can be based on the following formula:

$$T_{GSD} > 2 \cdot X_{SP} \frac{1}{\min(Diff_{Diff_G})} \cdot T_S \cdot N,$$

wherein min(Diff$_{Diff_G}$) describes the minimum value of the difference sequence of the sorted difference number series.

In embodiments, a first logical value [logic one, 1, for example] of the binary sequence can indicate an emission of a sub-data packet, wherein a second logical value [logic zero, 0, for example] of the binary sequence can indicate a transmission pause.

In embodiments, marked integral positions of the Golomb ruler or the mirrored version thereof can each be mapped by a first logical value [logic one, 1, for example] in the binary sequence, wherein non-marked integral positions of the Golomb ruler or the mirrored version thereof can each be mapped by a second logical value [logic zero, 0, for example] in the binary sequence.

In embodiments, a number of marked integral positions of the Golomb ruler or the mirrored version thereof can correspond to a number of sub-data packets.

In embodiments, the communication system can communicate wirelessly in a frequency band used for communication by a plurality of communication systems, wherein the data receiver is configured to receive a plurality of sub-data packets which are transmitted distributed in correspondence with a hopping pattern, and to combine the plurality of sub-data packets to obtain a data packet split onto the plurality of sub-data packets, wherein the hopping pattern is derived from a binary sequence, wherein an autocorrelation function of the binary sequence comprises autocorrelation side maximums with a predetermined maximum value [λ=1 or λ=2, for example], wherein a minimum total emission duration within which the plurality of sub-data packets are emitted, and/or a maximum length of the sub-data packets is/are dependent on a minimum value of a difference sequence of a sorted difference number series derived from the binary sequence [such that autocorrelation side maximums of an autocorrelation function of the emission of the plurality of sub-data packets comprise the same maximum values as the autocorrelation side maximums of the autocorrelation function of the binary sequence, for example].

In embodiments, the difference number series can indicate [in a predetermined order [in ascending or descending order, for example]] all the distance between all the elements [digits, for example] of the binary sequence comprising a predetermined logical value [a first logical value, for example, like logic one, 1], wherein the difference sequence indicates all the differences between directly neighboring values of the difference number series.

In embodiments, the binary sequence can map, or map at least partly, a Golomb ruler, a mirrored version of a Golomb ruler or a Barker sequence.

In embodiments, autocorrelation side maximums of an autocorrelation function of the emission of the plurality of sub-data packets can comprise the same maximum value as the autocorrelation side maximums of the autocorrelation function of the binary sequence.

In embodiments, one element among
the minimum total emission duration and
the maximum length of the sub-data packets may depend on
a symbol duration,
a number of sub-data packets,
the minimum value of the difference sequence of the sorted difference number series, and
the other element among the total emission duration and the length of the sub-data packets [such that autocorrelation side maximums of an autocorrelation function of the emission of the plurality of sub-data packets comprise the same maximum values as the autocorrelation side maximums of the autocorrelation function of the binary sequence, for example].

In embodiments, the dependence of the maximum length $X_{SP}$ of the sub-data packets on the symbol duration $T_S$, the number N of sub-data packets and the total emission duration $T_{GSD}$ can be based on the following formula:

$$X_{SP} < \frac{1}{2}\min(Diff_{Diff_G}) \cdot \frac{T_{GSD}}{T_S \cdot N},$$

wherein min(Diff$_{Diff_G}$) describes the minimum value of the difference sequence of the sorted difference number series.

In embodiments, the dependence of the minimum total emission duration $T_{GSD}$ on the symbol duration $T_S$, the number of N of sub-data packets and the maximum length $X_{SP}$ of the sub-data packets can be based on the following formula:

$$T_{GSD} > 2 \cdot X_{SP} \frac{1}{\min(Diff_{Diff_G})} \cdot T_S \cdot N,$$

wherein min(Diff$_{Diff_G}$) describes the minimum value of the difference sequence of the sorted difference number series.

In embodiments, a first logical value [logic one, 1, for example] of the binary sequence can indicate an emission of a sub-data packet, wherein a second logical value [logic zero, 0, for example] of the binary sequence can indicate a transmission pause.

In embodiments, marked integral positions of the Golomb ruler or the mirrored version thereof can each be mapped by a first logical value [logic one, 1, for example] in the binary sequence, wherein non-marked integral positions of the Golomb ruler or the mirrored version thereof can each be mapped by a second logical value [logic zero, 0, for example] in the binary sequence.

In embodiments, a number of marked integral positions of the Golomb ruler or the mirrored version thereof can correspond to a number of sub-data packets.

Further embodiments provide a method for transmitting a data packet in a communication system, wherein the communication system communicates wirelessly in a frequency band used for communication by a plurality of communication systems. The method comprises a step of splitting a data packet onto a plurality of sub-data packets. Additionally, the method comprises a step of emitting the plurality of sub-data packets in correspondence with a hopping pattern [time and/or frequency hopping pattern, for example], wherein the hopping pattern is derived from a binary sequence, wherein an autocorrelation function of the binary sequence comprises autocorrelation side maximums with a predetermined maximum value [λ=1 or λ=2, for example], wherein a minimum total emission duration within which the plurality of sub-data packets are emitted, and/or a maximum length of the sub-data packets is/are dependent on a minimum value of the difference sequence of a sorted difference number series derived from the binary sequence [such that autocorrelation side maximums of an autocorrelation function of the emission of the plurality of sub-data packets comprise the same maximum value as the autocorrelation side maximums of the autocorrelation function of the binary sequence, for example].

Further embodiments provide a method for receiving a data packet in a communication system, wherein the communication system communicates wirelessly in a frequency band used for communication by a plurality of communication systems. The method comprises a step of receiving a plurality of sub-data packets which are transmitted distributed in correspondence with a hopping pattern. Additionally, the method comprises a step of combining the plurality of sub-data packets to obtain the data packet split onto the plurality of sub-data packets, wherein the hopping pattern is derived from a binary sequence, wherein an autocorrelation function of the binary sequence comprises autocorrelation side maximums with a predetermined maximum value [$\lambda=1$ or $\lambda=2$, for example], wherein a minimum total emission duration within which the plurality of sub-data packets are emitted, and/or a maximum length of the sub-data packets is/are dependent on a minimum value of a difference sequence of a sorted difference number series derived from the binary sequence [such that autocorrelation side maximums of an autocorrelation function of the emission of the plurality of sub-data packets comprise the same maximum value as the autocorrelation side maximums of the autocorrelation function of the binary sequence, for example].

Further embodiments provide a method for generating a hopping pattern for transmitting a plurality of sub-data packets in a communication system. The method comprises a step of deriving a hopping pattern from a binary sequence, wherein an autocorrelation function of the binary sequence comprises autocorrelation side maximums with a predetermined maximum value [$\lambda=1$ or $\lambda=2$, for example]. Additionally, the method comprises a step of determining a maximum sub-data packet length [temporal length, for example, like number of symbols] for the plurality of sub-data packets in dependence on an total emission duration, indicated by the hopping pattern, of the plurality of sub-data packets and a minimum value of a difference sequence of a sorted difference number series derived from the binary sequence [such that autocorrelation side maximums of an autocorrelation function of the emission of the plurality of sub-data packets in correspondence with the hopping pattern comprise the same maximum value as the autocorrelation side maximums of the autocorrelation function of the binary sequence, for example].

In embodiments, the maximum sub-data packet length can additionally be determined in dependence on a symbol duration and a number of the sub-data packets.

In embodiments, the maximum sub-data packet length $X_{SP}$ can be determined based on the following formula:

$$X_{SP} < \frac{1}{2}\min(\text{Diff}_{\text{Diff}_G}) \cdot \frac{T_{GSD}}{T_S \cdot N}$$

wherein $T_{GSD}$ describes the total emission duration of the plurality of sub-data packets, wherein $T_S$ describes the symbol duration, wherein N describes the number of sub-data packets, and wherein $\min(\text{Diff}_{\text{Diff}_G})$ describes the minimum value of the difference sequence of the sorted difference number series.

In embodiments, the difference number series can [in a predetermined order [like ascending or descending order]] indicate all the distances between all the digits of the binary sequence which comprise a predetermined logical value [a first logical value, for example, like logic one, 1], wherein the difference sequence indicates all the differences between directly neighboring values of the difference number series.

Further embodiments provide a method for generating (K) hopping patterns with predetermined autocorrelation properties or features [and, for example, predetermined cross-correlation features]. The method comprises a step of providing a unipolar basic binary sequence derived from a Golomb ruler or a Barker sequence, the Golomb ruler or the Barker sequence comprising a predetermined order (E) [and, for example, a predetermined length L(=E)]. The method additionally comprises a step of deriving a plurality of binary sequences from the basic binary sequence based on a different arrangement of distances between successive elements of the basic binary sequence having a predetermined logical value [a first logical value, for example, like, for example, logic one, 1]. Additionally, the method comprises a step of determining, for each of the plurality of binary sequences, a difference number series to obtain a plurality of difference number series for the plurality of binary sequences, wherein a respective difference number series indicates all the distances between all the elements [digits, for example] of the respective binary sequence which comprise a predetermined logical value [a first logical value, for example, like, for example, logic one, 1]. The method additionally comprises a step of determining a difference sequence for each of the plurality of difference number series to obtain a plurality of difference sequences for the plurality of difference number series, wherein a respective difference sequence indicates all the differences between directly neighboring values of the respective difference number series. Additionally, the method comprises a step of determining a minimum value for each of the plurality of difference sequences to obtain a plurality of minimum values. Additionally, the method comprises a step of selecting a predetermined number K of binary sequences from the plurality of binary sequences, wherein those binary sequences from the plurality of binary sequences are selected whose minimum values are the greatest. Additionally, the method comprises a step of deriving a hopping pattern from each of the K selected binary sequences to obtain K hopping patterns.

In embodiments, deriving the plurality of binary sequences from the basic binary sequence can comprise a step of determining a basic distance sequence based on the basic binary sequence, wherein the basic distance sequence indicates all the distances between successive elements of the binary sequence which comprise a predetermined logical value [a first logical value, for example, like, for example, logic one, 1]. Additionally, deriving the plurality of binary sequences from the basic binary sequence can comprise a step of permuting [for example, randomly exchanging or changing the order of] the elements of the basic distance sequence to obtain a plurality of different distance sequences. Deriving the plurality of binary sequences from the basic binary sequence can comprise a step of calculating the plurality of binary sequences from the plurality of difference distance sequences so that a respective binary sequence of the plurality of binary sequences comprises elements with a predetermined logical value [a first logical value, for example, like logic one, 1] at those positions or digits which are indicated by a respective distance sequence.

In embodiments, when deriving the K hopping patterns from the K selected binary sequences, the elements of a respective binary sequence of the plurality of binary sequences can be provided with a factor dependent on a total emission duration and a symbol duration.

In embodiments, the basic binary sequence can be provided with a factor dependent on a total emission duration and a symbol duration.

In embodiments, when deriving the K hopping patterns from the K selected binary sequences, transmission times or transmission time hops of a respective hopping pattern can be derived from the respective binary sequence.

In embodiments, the method can further comprise a step of randomly generating at least two transmission frequency sequences for at least two of the K hopping patterns from a set of available transmission frequencies. Additionally, the method can comprise a step of calculating a two-dimensional cross-correlation function between the at least two hopping patterns. Additionally, the method can comprise a step of checking whether cross-correlation side values of the two-dimensional cross-correlation function do not exceed a predetermined maximum value [λ=1 or λ=2, for example]. In addition, the method can comprise a step of providing the at least two hopping patterns in case the cross-correlation side values do not exceed the predetermined maximum value. Additionally, the method can comprise a step of permuting at least one of the at least two transmission frequency sequences and performing again the steps of calculating a two-dimensional cross-correlation function and of checking whether cross-correlation side values of the two-dimensional cross-correlation function do not exceed a predetermined maximum value, in case the cross-correlation side values exceed the predetermined maximum value, wherein the transmission frequencies indicated by the at least two transmission frequency sequences are [on average, for example] distributed as equally as possible over the set of available transmission frequencies.

In embodiments, the predetermined maximum value for the cross-correlation side values of the cross-correlation function can be one or two.

In embodiments, a maximum length of the sub-data packets which can be transmitted with the respective hopping pattern can be selected such that an autocorrelation function of a version, projected onto a time axis, of the hopping pattern comprises [exclusively, for example] autocorrelation side values which are smaller than or equal one, wherein the predetermined maximum value for the cross-correlation side values of the two-dimensional cross-correlation function is one, wherein a number of transmission frequencies, used here, of the set of transmission frequencies can be estimated [determined, for example] based on the following formula:

$C \geq \text{floor}(1.9 \cdot K)$ wherein C describes the number of required transmission frequencies, and wherein K describes the number of different hopping patterns.

In embodiments, a maximum length of the sub-data packets can be determined based on the following formula:

$$X_{SP} < \frac{1}{2} \min(\text{Diff}_{\text{Diff}_G}) \cdot \frac{T_{GSD}}{T_S \cdot N}$$

wherein $T_{GSD}$ describes the total emission duration of the plurality of sub-data packets, wherein $T_S$ describes the symbol duration, wherein N describes the number of sub-data packets, and wherein $\min(\text{Diff}_{\text{Diff}_G})$ describes the minimum value of the difference sequence of the sorted difference number series.

In embodiments, a maximum length of the sub-data packets which can be transmitted with the respective hopping pattern can be selected such that an autocorrelation function of a version, projected onto a time axis, of the hopping pattern comprises [exclusively, for example] autocorrelation side values which are smaller than or equal a threshold value T [two or three, for example], wherein the maximum value for the cross-correlation side values of the two-dimensional cross-correlation function is smaller than or equals the same threshold value T, wherein a number of transmission frequencies, used here, of the set of transmission frequencies can be determined based on the following formula:

$C \geq \text{floor}(1.5 \cdot T \cdot K)$ wherein C describes the number of transmission frequencies, and wherein K describes the number of different hopping patterns, wherein the threshold value T [which exemplarily is a natural number and] describes a factor by which the maximum value is greater than one.

In embodiments, a maximum length of the sub-data packets can be determined based on the following formula:

$$X_{SP} < \frac{1}{2} \min(\text{Diff}_{\text{Diff}_G}) \cdot \frac{T_{GSD}}{T_S \cdot N} \cdot T$$

wherein $T_{GSD}$ describes the total emission duration of the plurality of sub-data packets, wherein $T_S$ describes the symbol duration, wherein N describes the number of sub-data packets, and wherein $\min(\text{Diff}_{\text{Diff}_G})$ describes the minimum value of the difference sequence of the sorted difference number series, wherein T [is a natural number, for example, and] describes a factor by which the maximum value is greater than one.

Further embodiments provide a data transmitter configured to emit a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a data transmitter configured to emit a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 2459 | 2704 | 2971 | 3237 | 3504 |
| 2 | 3504 | 2459 | 2704 | 1904 | 2171 | 3237 | 2971 |
| 3 | 3504 | 2171 | 2704 | 1904 | 3237 | 2971 | 2459 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 0 | 9 | 18 | 3 | 12 | 21 | 6 | 15 |
| 2 | 4 | 10 | 22 | 16 | 7 | 19 | 13 | 1 |
| 3 | 23 | 14 | 17 | 8 | 20 | 11 | 5 | 2 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a data transmitter configured to emit a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 756 | 688 | 823 | 892 | 621 | 552 | 406 |
| 2 | 553 | 484 | 756 | 892 | 823 | 688 | 542 |
| 3 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 1 | 8 | 14 | 22 | 17 | 5 | 12 | 3 |
| 2 | 18 | 4 | 9 | 13 | 15 | 11 | 20 | 0 |
| 3 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

In embodiments, the data transmitter can be configured to emit, by means of the data signal, eight sub-data packets in correspondence with the hopping pattern [such that one of the eight sub-data packets is emitted with each hop of the hopping pattern, for example].

In embodiments, the data transmitter can be configured to provide at least 24 uplink sub-data packets [uplink radio bursts, for example] in correspondence with the ETSI TS 103 357 standard, wherein the data transmitter is configured to combine three of the 24 uplink sub-data packets each to form a long sub-data packet to obtain eight long sub-data packets, wherein the data transmitter is configured to emit, by means of the data signal, the eight long sub-data packets in correspondence with the hopping pattern [such that one of the eight long sub-data packets is emitted with each hop of the hopping pattern, for example].

In embodiments, the data transmitter can be configured to provide 24 uplink sub-data packets of the core frame of the ETSI TS 103 357 standard.

In embodiments, the data transmitter can be configured to provide 24 uplink sub-data packets of the core frame of the ETSI TS 103 357 standard, and to combine three of the 24 uplink sub-data packets of the core frame each to form a long sub-data packet to obtain eight long sub-data packets for the core frame, wherein the data transmitter is additionally configured to provide further uplink sub-data packets of the extension frame of the ETSI TS 103 357 standard, wherein the data transmitter is configured to emit the uplink sub-data packets of the extension frame [not to combine these, for example, to form long sub-data packets but] in correspondence with the ETSI TS 103 357 standard.

In embodiments, the data transmitter can be configured to provide 24 uplink sub-data packets of the core frame of the ETSI TS 103 357 standard, and to combine three of the 24 uplink sub-data packets of the core frame each to form a long sub-data packet to obtain eight long sub-data packets for the core frame, wherein the data transmitter is configured to provide further uplink sub-data packets of the extension frame of the ETSI TS 103 357 standard, wherein the data transmitter is configured to combine three of the uplink sub-data packets of the extension frame each to form a long sub-data packet.

Further embodiments provide a data receiver configured to receive a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a data receiver configured to receive a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 2459 | 2704 | 2971 | 3237 | 3504 |
| 2 | 3504 | 2459 | 2704 | 1904 | 2171 | 3237 | 2971 |
| 3 | 3504 | 2171 | 2704 | 1904 | 3237 | 2971 | 2459 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 0 | 9 | 18 | 3 | 12 | 21 | 6 | 15 |
| 2 | 4 | 10 | 22 | 16 | 7 | 19 | 13 | 1 |
| 3 | 23 | 14 | 17 | 8 | 20 | 11 | 5 | 2 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a data receiver configured to receive a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 756 | 688 | 823 | 892 | 621 | 552 | 406 |
| 2 | 553 | 484 | 756 | 892 | 823 | 688 | 542 |
| 3 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 1 | 8 | 14 | 22 | 17 | 5 | 12 | 3 |
| 2 | 18 | 4 | 9 | 13 | 15 | 11 | 20 | 0 |
| 3 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

In embodiments, the data receiver can be configured to receive, by means of the data signal, eight sub-data packets in correspondence with the hopping pattern [such that one of the eight sub-data packets is received with each hop of the hopping pattern, for example].

In embodiments, the data receiver can be configured to receive, by means of the data signal, eight long sub-data packets in correspondence with the hopping pattern [such that one of the eight long sub-data packets is received with each hop of the hopping pattern, for example], wherein each of the eight long sub-data packets comprises three of 24 uplink sub-data packets [uplink radio bursts, for example] in correspondence with the ETSI TS 103 357 standard, wherein the data receiver is configured to process the eight long sub-data packets to obtain the 24 uplink sub-data packets.

In embodiments, the 24 uplink sub-data packets can be the 24 uplink sub-data packets of the core frame of the ETSI TS 103 357 standard.

In embodiments, the data receiver can additionally be configured to receive uplink sub-data packets of the extension frame of the ETSI TS 103 357 standard.

In embodiments, the data receiver can additionally be configured to receive further long sub-data packets, wherein each of the further long sub-data packets comprises three uplink sub-data packets [like uplink radio bursts] of the extension frame in correspondence with the ETSI TS 103 357 standard, wherein the radio receiver is configured to process the further long sub-data packets to obtain the uplink sub-data packets.

In embodiments, the data receiver can be configured to process the respective uplink sub-data packets in correspondence with the ETSI TS 103 357 standard.

Further embodiments provide a method for transmitting a signal, the method comprising a step of transmitting a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a method for transmitting a signal, the method comprising a step of transmitting a signal in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 2459 | 2704 | 2971 | 3237 | 3504 |
| 2 | 3504 | 2459 | 2704 | 1904 | 2171 | 3237 | 2971 |
| 3 | 3504 | 2171 | 2704 | 1904 | 3237 | 2971 | 2459 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| Frequency channel numbers of the individual hops | | | | | | | | |
|---|---|---|---|---|---|---|---|---|
| No. | 1 | 2 | 3 | 4 | 5 | 6 | 7 | 8 |
| 1 | 0 | 9 | 18 | 3 | 12 | 21 | 6 | 15 |
| 2 | 4 | 10 | 22 | 16 | 7 | 19 | 13 | 1 |
| 3 | 23 | 14 | 17 | 8 | 20 | 11 | 5 | 2 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a method for transmitting a signal, the method comprising a step of transmitting a signal in correspondence with a hopping pattern, wherein the hopping pattern is a time hopping pattern, a frequency hopping pattern or a combination of the time hopping pattern and the frequency hopping pattern,
wherein the time hopping pattern is one of the three time hopping patterns, mentioned in the table below, each having eight hops

| Difference to a respective directly preceding hop in multiples of $T_S$ | | | | | | | |
|---|---|---|---|---|---|---|---|
| No. | 1 | 2 | 3 | 4 | 5 | 6 | 7 |
| 1 | 756 | 688 | 823 | 892 | 621 | 552 | 406 |
| 2 | 553 | 484 | 756 | 892 | 823 | 688 | 542 |
| 3 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| Frequency channel numbers of the individual hops | | | | | | | | |
|---|---|---|---|---|---|---|---|---|
| No. | 1 | 2 | 3 | 4 | 5 | 6 | 7 | 8 |
| 1 | 1 | 8 | 14 | 22 | 17 | 5 | 12 | 3 |
| 2 | 18 | 4 | 9 | 13 | 15 | 11 | 20 | 0 |
| 3 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a method for receiving a signal, the method comprising a step of receiving a signal transmitted in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| Difference to a respective directly preceding hop in multiples of $T_S$ | | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| Frequency channel numbers of the individual hops | | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a method for receiving a signal, the method comprising a step of receiving a signal transmitted in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| Difference to a respective directly preceding hop in multiples of $T_S$ | | | | | | | |
|---|---|---|---|---|---|---|---|
| No. | 1 | 2 | 3 | 4 | 5 | 6 | 7 |
| 1 | 1904 | 2171 | 2459 | 2704 | 2971 | 3237 | 3504 |
| 2 | 3504 | 2459 | 2704 | 1904 | 2171 | 3237 | 2971 |
| 3 | 3504 | 2171 | 2704 | 1904 | 3237 | 2971 | 2459 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 0 | 9 | 18 | 3 | 12 | 21 | 6 | 15 |
| 2 | 4 | 10 | 22 | 16 | 7 | 19 | 13 | 1 |
| 3 | 23 | 14 | 17 | 8 | 20 | 11 | 5 | 2 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

Further embodiments provide a method for receiving a signal, the method comprising a step of receiving a signal transmitted in correspondence with a hopping pattern, wherein the hopping pattern is a time hopping pattern, a frequency hopping pattern or a combination of the time hopping pattern and the frequency hopping pattern, wherein the time hopping pattern is one of the three time hopping patterns, mentioned in the table below, each having eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 756 | 688 | 823 | 892 | 621 | 552 | 406 |
| 2 | 553 | 484 | 756 | 892 | 823 | 688 | 542 |
| 3 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point [center, beginning or end, for example] of the respective hop to an equal reference point [center, beginning or end, for example] of a directly preceding hop in symbol durations or multiples of symbol durations, wherein the frequency hopping pattern is one of the three frequency hopping patterns, mentioned in the table below, each having eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 1 | 8 | 14 | 22 | 17 | 5 | 12 | 3 |
| 2 | 18 | 4 | 9 | 13 | 15 | 11 | 20 | 0 |
| 3 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

BRIEF DESCRIPTION OF THE DRAWINGS

Embodiments of the present invention will be described below in greater detail referring to the appended drawings, in which:

FIG. 2 shows an occupancy of the transmission channel when transmitting a plurality of sub-data packets in correspondence with a time and frequency hopping pattern in a diagram;

FIG. 3 shows a schematic view of a Golomb ruler with E=5 marks and a length N=12;

DETAILED DESCRIPTION OF THE INVENTION

Figure 1:
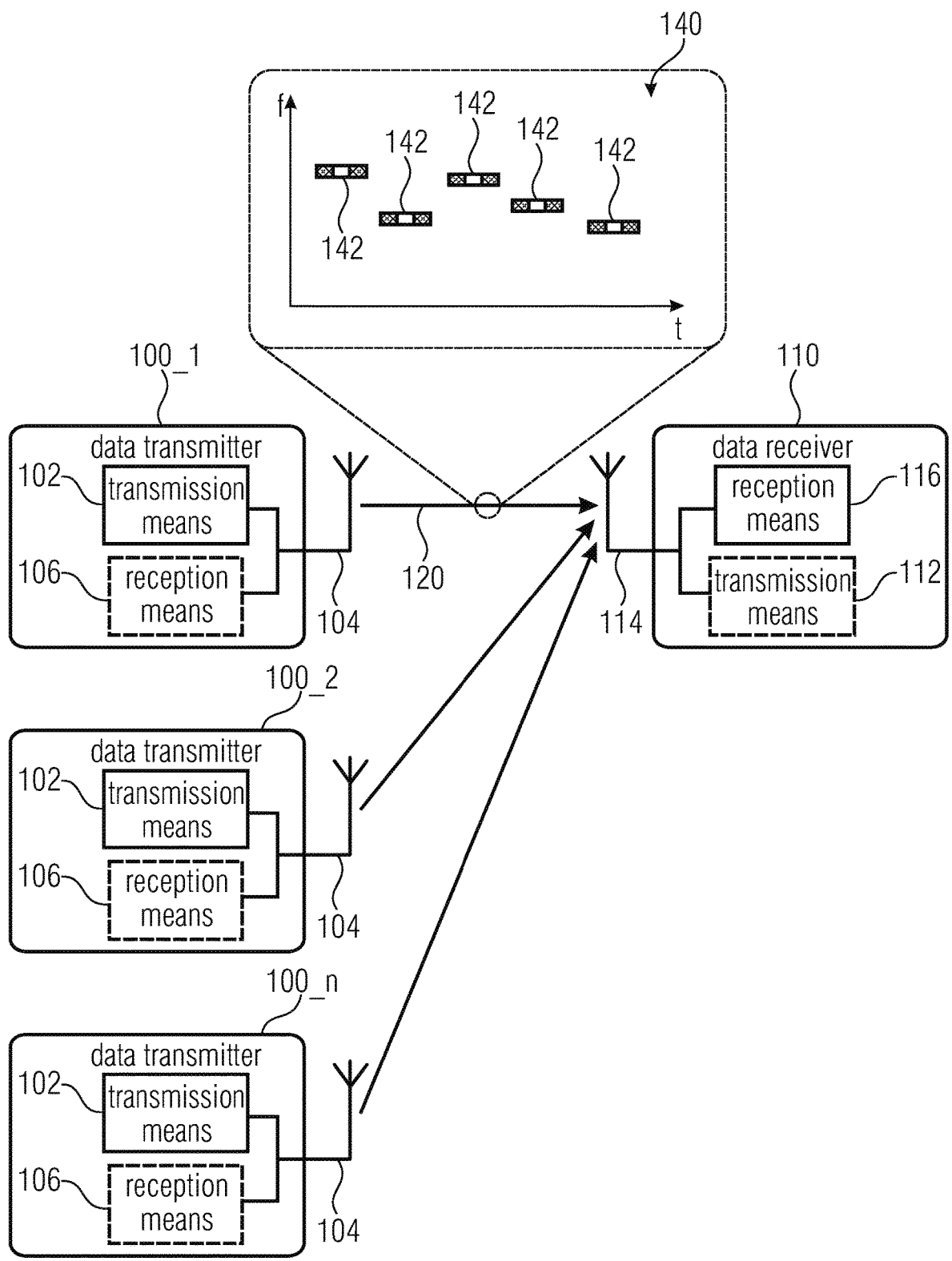
FIG. 1 shows a schematic block circuit diagram of a system with one or more data transmitters and a data receiver.

In the following description of the embodiments of the present invention, the same or similarly acting elements are given the same reference numerals in the figures, so that their description is interchangeable.

FIG. 1 shows a schematic block circuit diagram of a communication system with one or more data transmitters 100_1-100_n, n≥1, and a data receiver 110. Here, the communication system communicates wirelessly in a frequency band (e.g. ISM band) used for communication by a plurality of communication systems.

In the communication system shown in FIG. 1, a data transmitter, e.g. the data transmitter 100_1, can be configured to split a data packet (e.g. of the physical layer) into a plurality of sub-data packets 142 and to emit the plurality of sub-data packets 142 distributed in time and/or frequency according to a hopping pattern 140, e.g. by means of a signal 120 comprising the plurality of sub-data packets 142.

The data receiver 110 can be configured to receive the plurality of sub-data packets 142 transmitted distributed in time and/or frequency according to the hopping pattern 140, and to combine the plurality of sub-data packets 142 to obtain the data packet (e.g. of the physical layer) split into the plurality of sub-data packets 142.

As exemplified in FIG. 1, a data transmitter, like the data transmitter 100_1, can include transmission means (or a transmission module, or transmitter) 102 configured to transmit the signal 120 (e.g. with plurality of sub-data packets 142). The transmission means 102 can be connected to an antenna 104 (or antenna array) of the data transmitter 100_1. The data transmitter 100_1 can further comprise reception means (or a reception module, or receiver) 106 configured to receive a signal. The reception means 106 can be connected to the antenna 104 or another (separate) antenna (or antenna array) of the data transmitter 100_1. The data transmitter 100_1 can also comprise combined transmission/reception means or a transceiver.

The data receiver 110 can comprise reception means (or a receiving module, or receiver) 116 configured to receive the signal 120 (e.g. including the plurality of sub-data packets 142). The reception means 116 can be connected to an antenna 114 (or antenna array) of the data receiver 110. Furthermore, the data receiver 110 can include transmission means (or a transmitting module, or transmitter) 112 configured to transmit a signal. The transmission means 112 can be connected to the antenna 114 or another (separate) antenna (or (separate) antenna array) of the data receiver 110. The data receiver 110 can also comprise combined transmission/reception means or a transceiver.

For example, the data transmitter 100_1 can be a subscriber of the communication system, such as a terminal or sensor node (e.g. heating meter), while the data receiver 110 can be a base station of the communication system. Typically, a communication system includes at least one data receiver 110 (e.g. base station) and a plurality of data transmitters 100_1-100_n (e.g. participants or subscribers). Of course, it is also possible for the data transmitter 100_1 to be a base station of the communication system, while the data receiver 110 is a participant of the communication system. Furthermore, it is possible for both the data transmitter 100_1 and the data receiver 110 to be participants of the communication system. Furthermore, it is possible for both the data transmitter 100_1 and the data receiver 110 to be base stations of the communication system.

As indicated above, the data transmitter 100_1 and the data receiver 110 can be configured to transmit and receive data using the telegram splitting method. Here, a telegram or data packet (e.g. of the physical layer) is split into a plurality of sub-data packets (or partial data packets, or sub-packets) 142, and the plurality of sub-data packets 142 are transmitted from the data transmitter 100_1 to the data receiver 110 distributed in time and/or frequency in correspondence to the hopping pattern 140, wherein the data receiver 110 reassembles (or combines) the sub-data packets 142 to obtain the data packet. Each of the plurality of sub-data packets 142 contains only a part of the data packet. The data packet may further be channel-encoded such that only a part of the sub-data packets 142 is used to decode the data packet without error, rather than all of the sub-data packets 142.

The time distribution of the plurality of sub-data packets 142 can be distributed in correspondence with a time and/or frequency hopping pattern, as mentioned above.

A time hopping pattern can specify a sequence of transmission times or transmission time intervals at which the sub-data packets are transmitted. For example, a first sub-data packet can be sent at a first transmission time (or in a first transmission time slot) and a second sub-data packet can be transmitted at a second transmission time (or in a second transmission time slot), wherein the first transmission time and the second transmission time are different. The time hopping pattern can define (or predetermine or indicate) the first transmission time and the second transmission time. Alternatively, the time hopping pattern can indicate the first transmission time and a time interval between the first transmission time and the second transmission time. Of course, the time hopping pattern may also specify only the time interval between the first time and the second transmission time. There can be transmission pauses between the sub-data packets in which no transmission takes place.

A frequency hopping pattern can specify a sequence of transmission frequencies or transmission frequency hops at which the sub-data packets are transmitted. For example, a first sub-data packet may be transmitted at a first transmission frequency (or in a first frequency channel) and a second sub-data packet may be transmitted at a second transmission frequency (or in a second frequency channel), wherein the first transmission frequency and the second transmission frequency are different. The frequency hopping pattern may thereby define (or predetermine or indicate) the first transmission frequency and the second transmission frequency. Alternatively, the frequency hopping pattern may specify the first transmission frequency and a frequency interval (transmission frequency hop) between the first transmission frequency and the second transmission frequency. Of course, the frequency hopping pattern may also specify only the frequency interval (transmission frequency hop) between the first transmission frequency and the second transmission frequency.

Of course, the plurality of sub-data packets 142 may also be transmitted from the data transmitter 100_1 to the data receiver 110 distributed in both time and frequency. The distribution of the plurality of sub-data packets in time and in frequency may be in correspondence with a time and frequency hopping pattern. A time and frequency hopping pattern may be the combination of a time hopping pattern and a frequency hopping pattern, i.e. a sequence of transmission times or transmission time intervals with which the sub-data packets are transmitted, wherein transmission frequencies (or transmission frequency hops) are associated to the transmission times (or transmission time intervals).

FIG. 2 shows an occupancy of the frequency band/transmission channel when transmitting a plurality of sub-data packets 142 according to a time and frequency hopping pattern 140 in a diagram, where the ordinate describes the frequency and the abscissa describes time.

As can be seen in FIG. 2, the data packet can be split, for example, into L=7 sub-data packets 142 and be transmitted from the data transmitter 100_1 to the data receiver 110 distributed in time and frequency according to a time and frequency hopping pattern 140.

As can be further seen in FIG. 2, the sub-data packets 142 may include synchronization symbols 144 and data symbols 146.

The communication system described in FIGS. 1 and 2 can be an LPWAN (Low Power Wide Area Network) system as specified, for example, in ETSI TS 103 357 [9].

The embodiments of the data transmitter 100_1 and/or the data receiver 110 described below may be implemented, for example, in an LWPAN system such as specified in ETSI TS 103 357 [9], or in any other communication system which, for example, communicates wirelessly in a frequency band used for communication by a plurality of communication systems.

In embodiments, a so-called "contention-based access method" is used. In this case, the participants 100_1-100_n (e.g. terminals) of the communication system do not have exclusively allocated resources at their disposal, but several participants 110_1-110_n access a common range of radio resources on their own initiative. This can lead to access conflicts, i.e. simultaneous occupancy of resource elements by two or more participants. In the case of "contention-based access methods", a rough distinction can generally be made between the following variations:

a) In the case of purely unidirectional data transmission from participant (e.g. terminal) to base station, the participant emits its message according to a cyclic clocking (the duty cycle). Since the base station does not know the different transmission times of the individual participants, it receives continuously. Since there is no coordination between the participants, the channel accesses are asynchronous (unslotted) with any time granularity.

b) Variation a) can be extended to include a simple bidirectional interface. If the base station successfully receives a data packet from a participant, the base station can transmit to the subscriber a message immediately after the end of this transmission (immediate feedback, "ACK/NACK"). To receive this feedback channel, the participant switches on its receiver only for a very short time interval.

c) The base station here acts as a coordinating instance (master), for example by periodically emitting a beacon signal or other reference signals. The participants can synchronize to this and then access a time-limited range of radio resources on their own initiative in a competitive process (uncoordinated and independent of one another). The clocking of the access attempts is synchronized ("slotted") in time slots (so-called resource blocks) and each participant is only allowed to emit one of its sub-data packets at the beginning of a time slot.

In [4], [5] and [6], hopping patterns as well as a design of hopping patterns for the above variations a) and b) are described. Since some of the design specifications in [4], [5] and [6], such as the subdivision of the hopping patterns (with length L) into L/3 clusters, each with equal time and frequency intervals between the sub-data packets within the cluster, are no longer necessary for newer applications, and since newer applications have different latency and reliability requirements, new hopping patterns and/or new design specifications for hopping patterns are needed.

Embodiments of the present invention provide hopping patterns as well as generation rules (e.g. design rules) for hopping patterns specifically tailored to asynchronous ("unslotted") data transmission (e.g. variation a) and/or variation b)).

The starting point here are unipolar Barker sequences, which are identical with the so-called "Golomb rulers" [7, page 120]. These are binary sequences with elements $\in \{0, 1\}$ whose autocorrelation functions (ACF) have only minor or side values $\lambda \in \{0,1\}$. In the following, it is assumed as an example that a "1" in the binary sequence corresponds to the emission of a sub-data packet by a participant (e.g. terminal device). No sub-data packet is transmitted with a "0". Thus, two telegrams which both use the same basic hopping pattern, either do not interfere with each other at all (with $\lambda=0$) or in the worst case (with $\lambda=1$) only two sub-data packets collide with each other.

Of course, embodiments may also assume an inverted binary sequence, in which case it may be assumed that a "0" in the binary sequence corresponds to the emission of a sub-data packet by a participant (e.g. terminal device), while a "1" means that no sub-data packet is transmitted.

The theory of Golomb rulers as well as the terms entailed, like aperiodic ACF, area of an ACF or main-to-side (or principal-to-secondary) maximum ratio (MSR) are briefly described in the following. The detailed description of the embodiments based on this, in particular the application to asynchronous ("unslotted") transmission, is given in sections 1 to 3.

In mathematics, a Golomb ruler (named after Solomon W. Golomb) is a set of non-negative integers or marks where no pair of the numbers has the same difference (distance) from each other. Golomb rulers are categorized by their "order" and their "length", wherein the order E is defined by the number of marks and the length N is defined by the largest mark occurring. A Golomb ruler of order E=5 and length N=12 is shown in FIG. 3.

As can be seen in FIG. 3, the Golomb ruler 300 includes E=5 marks 302_1-302_5, with a first mark 302_1 set at the integer one, a second mark 302_2 set at the integer three, a third mark 302_3 set at the integer eight, a fourth mark 302_4 set at the integer nine, and a fifth mark 302_5 set at the integer twelve.

Considering the distances of the first mark 302_1 to the other four marks 302_2-302_5, the four distances {2,7,8,11} result. The second mark 302_2 has the three distances {5,6,9} to the remaining three right-hand marks 302_3-302_5 and the differences {1,4} result as distances for the third mark 302_3. The last distance between the fourth mark 302_4 and the fifth mark 302_5 is the {3}. Depending on the order E, $\sum_{e=1}^{E-1} e$ different distances result, i.e. ten different distances in the example shown in FIG. 3. In increasing order, this results in the difference number series {1,2,3,4,5,6,7,8,9,11} for all mark distances. It is clear that no distances occur twice in the difference number series.

The Golomb ruler $G_1=\{1,3,8,9,12\}_{N=12}$ shown in FIG. 3 can be interpreted as a binary unipolar non-periodic (or aperiodic) sequence with elements $\in \{0,1\}$, where the numbers of the five marks 302_1-302_5 indicate the digits occupied by one in the range $1 \leq n \leq N$ (and the other numbers indicate the digits occupied by zero (alternatively, of course, the numbers of the five marks 302_1-302_5 can also indicate the places occupied by zero in the range $1 \leq n \leq N$ and the other numbers indicate the digits occupied by one). Here, a binary sequence is called unipolar if it consists only of the elements $\in \{0,1\}$, while a binary sequence with the elements $\in \{-1,1\}$ is called bipolar. Thus, for the example shown in FIG. 3, a sequence s(n) of length N=12 results as follows:

$$s(n) = 1\ 0\ 1\ 0\ 0\ 0\ 0\ 1\ 1\ 0\ 0\ 1 \quad (1)$$

$$= \begin{cases} 1 \text{ für } n \in G_1 \\ 0 \text{ für } n \notin G_1 \end{cases},$$

$$n = 1(1)N$$

Golomb arrangements are characterized by the fact that their autocorrelation function (ACF) has only side values $\lambda \in \{0, 1\}$. The ACF for s(n) is defined as follows:

$$\varphi_{ss}(m) = \sum_n s^*(n) \cdot s(n+m), \text{ for } |m|=0(1)N-1 \quad (2)$$

where the * sign characterizes the conjugate-complex operation. In the case of real-valued sequences (assumed herein), this operation may be omitted. The expression $\Sigma_n(\cdot)$ means that the summation is done over all n for which the argument (•) does not vanish. The width of the ACF is 2N−1 and the ACF main maximum is always $\varphi_{ss}(0)=E$. For the ACF calculation, it is still to be considered that for binary sequences with the elements ∈ {0,1}, the multiplication in equation (2) is realized by the AND operation (often called logical multiplication). Such an ACF is often called "thumbtack ACF" in the English literature [8].

According to equation (2), the ACF of the sequence s(n) from equation (1) is calculated as follows:

$$\varphi_{ss}(m) = \tag{3}$$
$$1\ 0\ 1\ 1\ 1\ 1\ 1\ 1\ 1\ \underset{m=0}{\uparrow}\ 1\ 5\ 1\ 1\ 1\ 1\ 1\ 1\ 1\ 1\ 0\ 1,$$
$$m = -11(1)11.$$

All side values of the ACF from equation (3) have size one, "1", except at the two positions for m=±10. The reason for this is that the distance ten is missing in the above difference number series {1,2,3,4,5,6,7,8,9,11}. Golomb arrangements whose ACF side values contain only one are called perfect Golomb rulers. However, these exist only up to an order E=4 and a length N=7 [9]. For longer lengths N, the number of vanishing side values increases more and more. For "thumbtack ACFs" of binary unipolar and non-periodic sequences with elements ∈ {0,1} according to [7], the following applies for the "area" of the ACF:

$$\Sigma_m \varphi_{ss}(m) = E^2, \text{ for } |m|=0(1)N-1. \tag{4}$$

For example 1 from eq. (3), this means an area value of $E^2=25$ which is exactly the sum of $\varphi_{ss}(0)=E=5$ and corresponds to all ACF side values with λ=1. A "perfect Golomb ruler" of the order E=5 can therefore only have a length of N=11 if it would exist. For such "perfect Golomb rulers" the following applies:

$$2(N-1)=E^2-E. \tag{5}$$

By corresponding transformation of Eq. (5) to E, an upper bound results for binary unipolar non-periodic sequences whose ACF may only assume side values λ∈ {0,1}:

$$E \leq (\sqrt{8N-7}+1)/2. \tag{6}$$

Figure 4:
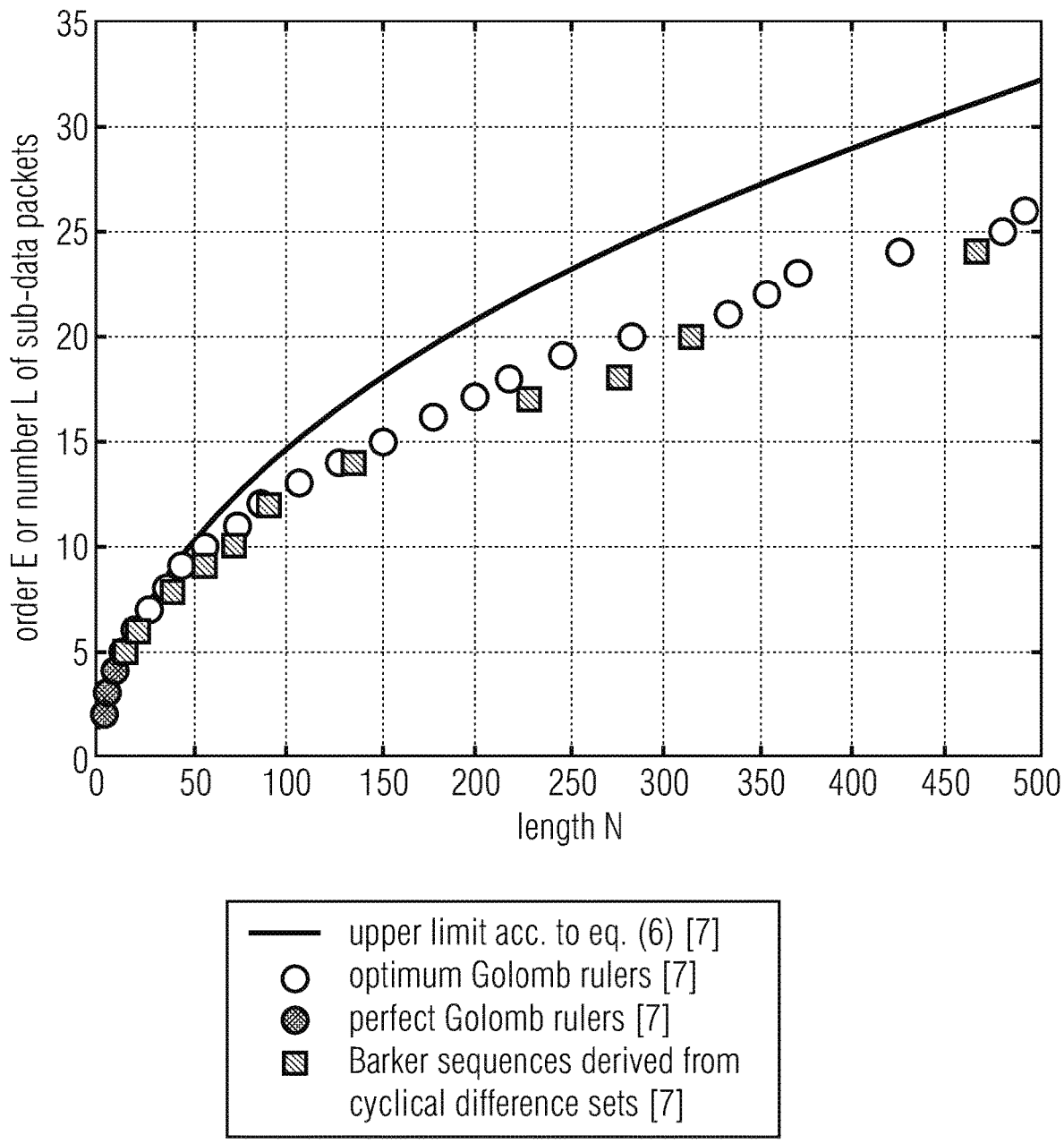
FIG. 4 shows an order E or number L of sub-data packets plotted against the length N or number of available resource elements for different non-periodic unipolar binary sequences in a diagram.

The waveform of Eq. (6) is shown in FIG. 4. For larger N, however, this bound is met even by the best known sequences to an increasingly poor extent, since the percentage of vanishing ACF side values with λ=0 increases more and more. The best non-periodic sequences shown in FIG. 4 are the so-called "optimal Golomb rulers" (OGR). An OGR, such as the one in FIG. 3, always has the shortest length N at a given order E. The highest known order of an "optimal Golomb ruler" is currently E=27 and a length of N=554. The first three Golomb rulers are "perfect Golomb rulers" for which applies the equals sign in Eq. (6).

Furthermore, according to [7], it is known that unipolar periodic binary sequences whose periodic autocorrelation functions (PAKCF) have only side values with λ≤1 retain this feature even when used as unipolar non-periodic binary sequences for their ACF side values. In particular, the so-called cyclic difference sets with identical PACF side values of λ=1 can be used advantageously as a starting point for a conversion into non-periodic binary sequences. All 35 known difference sets with λ=1 are described in a table in [8] up to a period length of Ñ=9507 with (E=98 and λ=1). A cyclic difference set $D_1=\{d_1, d_2, \ldots, d_E\}$ contains the E integers whose differences mod Ñ

$$(d_i - d_j) \mod \tilde{N}, (i \neq j) \tag{7}$$

Take each value 1,2, . . . , Ñ−1 exactly λ times [8]. A second example with $D_2=\{1,3,13,16,17\}_{\tilde{N}=21}$ shows a cyclic difference set $D_2$ with the parameters Ñ=21, E=5, and λ=1. Compared to the first example with $G_1=\{1,3,8,9,12\}_{N=12}$, it can be seen that with the same order E and the same (P)ACF side values with λ≤1 the period length with Ñ=21 for the cyclic difference set is significantly longer than the non-periodic length of the "optimal Golomb ruler" with N=12. However, there is a possibility to significantly reduce the aperiodic length N resulting from the period length Ñr. For this, the difference set $D_2=\{1,3,13,16,17\}_{\tilde{N}=21}$ is written as a periodic sequence š(n) in binary form:

$$\tilde{s}(n) = 1\ 0\ 1\ 0\ 0\ 0\ 0\ 0\ 0\ 0\ 0\ 1\ 0\ 0\ 1\ 1\ 0\ 0\ 0\ 0 \tag{8}$$
$$= \begin{cases} 1 \text{ für } n \in D_2 \\ 0 \text{ für } n \notin D_2 \end{cases},$$
$$n = 1(1)\tilde{N}.$$

According to Eq. (2), the zeros at the right and left edge may be omitted for non-periodic sequences. Therefore, the then non-periodic sequence from eq. (8) could be shortened by the right four zeros and thus be reduced to a length of N=17. However, it is also known from [7] that periodic sequences may be rotated cyclically without changing the PACF and thus the side maximums. If the sequence s(n) from eq. (8) is rotated to the right or to the left in such a way that the longest zero sequence (in the example the nine zeros) is now at the edge, and if these zeros are then truncated, a new non-periodic sequence of length N=12 results:

$$s(n) = 1\ 0\ 0\ 1\ 1\ 0\ 0\ 0\ 1\ 0\ 1 \tag{9}$$
$$= \begin{cases} 1 \text{ für } n \in G_2 \\ 0 \text{ für } n \notin G_2 \end{cases},$$
$$n = 1(1)1N.$$

It turns out that the non-periodic sequence $G_2=\{1,4,5,10,12\}_{N=12}$ from eq. (9) happens to be the mirror image of s(−n) of the Golomb ruler $G_1=\{1,3,8,9,12\}_{N=12}$ from eq. (1) and thus also represents a Golomb ruler. Parallel shifts (addition or deletion of zeros at the edges, corresponding to $s(n-n_0)$), as well as mirroring s(−n) are trivial invariance operations which leave the ACF of unipolar non-periodic binary sequences unchanged. In this respect, there is always a mirror pair for each binary sequence, although usually only one is mentioned. Finally, it should be mentioned that the unipolar non-periodic binary sequences derived from the cyclic difference set with ACF side values of λ∈ {0,1} normally have a greater length N than the Golomb rulers of the same order E, see also FIG. 4. Only in the case of relatively short lengths does this procedure also produce Golomb rulers again. Such unipolar non-periodic binary sequences resulting from the cyclic difference sets (with λ=1) are also called Barker sequences according to [7]

because their ACF have only side values ∈ {0,1}. All non-optimal Golomb rulers thus fall into the family of unipolar Barker sequences.

For the following applications, the quality measure of main-to-side maximum ratio (MSR) according to the definition $$MSR = \frac{\varphi_{ss}(0)}{\max |\varphi_{ss}(m)|} \forall\, m \neq 0 \qquad (10)$$

is significant. The MSR evaluates the impulsive intrinsic disturbance by the ACF side values. For OGR or Barker sequences, MSR=E always applies.

To avoid full collisions, usually K different hopping patterns are used, which differ from one another in their time and frequency behavior. (We speak of a full collision if 2 data transmitters emit an identical hopping pattern independently of each other at the same time and at the same frequency position. As a result, all L sub-data packets of the two data transmitters (e.g. participants) collide and, despite existing error protection, this usually leads to a loss of the two telegrams). If a whole family of K binary sequences (e.g. three binary sequences) is used instead of a single binary sequence, then in addition to the good ACF properties with the lowest possible side maximums mentioned so far, these sequences should also have good correlation properties among themselves in the aperiodic cross-correlation function (CCF). When generalizing eq. (2), the CCF reads as follows $$\varphi_{ij}(m) = \Sigma_n s_i^*(n) \cdot s_j(n+m), \text{for } |m|=0(1)N-1 \qquad (11)$$

wherein it is assumed that the length of the sequences $s_i(n)$ and $s_j(n)$ always equals to N. If a family of K binary sequences is considered, then the CCF according to Eq. (11) is to be carried out for all k possible combinations of the hopping patterns, i.e. for all permutations i=0(1)K−1, j=0(1)K−1, with i≠j.

The embodiments described below provide unipolar aperiodic binary sequences with improved (e.g. good) correlation properties and/or show how to create unipolar aperiodic binary sequences with improved (e.g. good) correlation properties. Improved (e.g. good) correlation properties are characterized by a maximum main-side maximum ratio. Since the ACF main maximum for unipolar binary sequences always equals the order E, the above requirement corresponds to minimum ACF side values of λ∈{0,1}. Optimal Golomb rulers or Barker sequences are characterized by exactly these properties.

1. Generation (e.g. Design) of Hopping Patterns for Asynchronous Transmission with Maximum Sub-data Packet Length In unsynchronized TSMA networks, a large number of participants (e.g. users) each transmits L sub-data packets with a sub-data packet duration of $T_{SP}$ within a given total transmission time $T_{GSD}$. For simplicity, it is assumed in the following that all participants (e.g. users) always have the same total transmission time and identical sub-data packet lengths. Each of the L sub-data packets contains $X_{SP}$ symbols, which in turn consist of pilot and data symbols.

Figure 5:
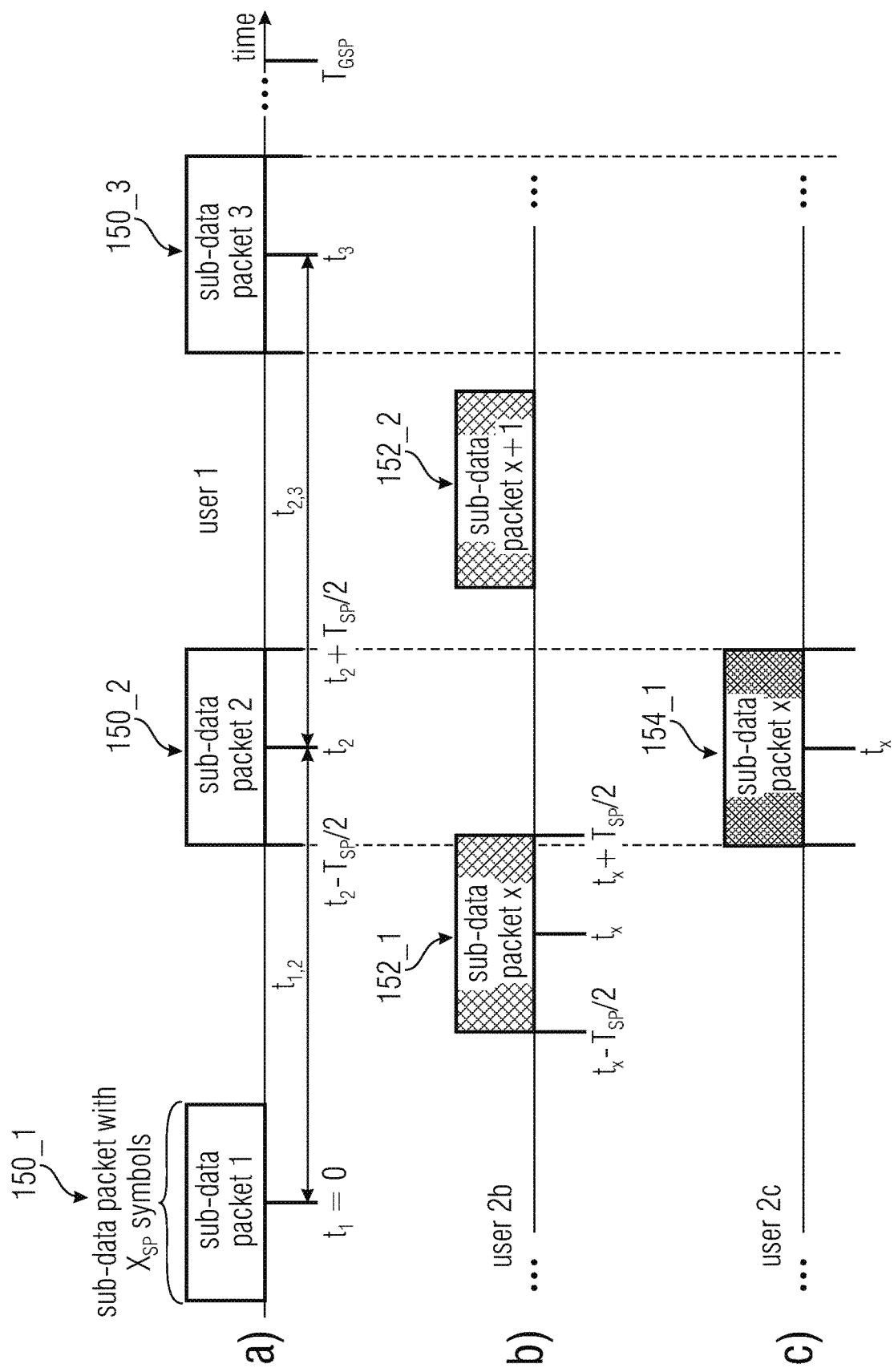
FIG. 5 shows occupancies of a communication channel when emitting sub-data packets by three different subscribers (users)

FIG. 5 shows an occupancy of a communication channel when three different participants (users) emit sub-data packets.

Section a of FIG. 5 shows an occupancy of the communication channel when three sub-data packets 150_1, 150_2 and 150_3 are emitted by a first participant (e.g. user 1), with a center of the first sub-data packet at $t_1=0$ and a center of the second sub-data packet at $t_2$. The time intervals $t_{l,(l+1)}$, which each represent the distance between two adjacent sub-data packet centers at $t_l$ and $t_{l+1}$ have different lengths.

Section b of FIG. 5 shows an occupancy of the communication channel when emitting two sub-data packets 152_1 and 152_2 by a second participant (e.g. user 2b), which exhibits asynchronous timing behavior with respect to the first participant (e.g. user 1). The second participant emits its sub-data packets 152_1 and 152_2 at random start times relative to the first subscriber (e.g. user 1) (sub-data packet center of sub-data packet 152_1 at $t_x$). Here, the sub-data packet 152_1 of the second participant (e.g. user 2a) overlaps with the sub-data packet 150_2 of the first participant (e.g. user 1) if the sub-data packet center of the sub-data packet of the second participant (e.g. user 2) is within the interval $$t_2 - T_{SP} < t_x < t_2 T_{SP} \qquad (12)$$

The probability that two sub-packets from two participants overlap is twice as high in an unsynchronized TSMA network as in a synchronous network, as is illustrated in section c of FIG. 5. In synchronous transmission, the base station specifies a grid of time slots for channel accesses. Therefore, in synchronous transmission, there are only two states: either there is complete overlap of two sub-data packets, such as sub-data packet 150_2 of the first participant (e.g. user 1) and sub-data packet 154_1 of the third participant (e.g. user 2c), or no overlap as in the case of sub-data packet 150_3 of the first participant (e.g. user 1) where the third participant (e.g. user 2c) is not transmitting. Therefore, in synchronous networks, the collision occurs only in the interval $$t_2 - T_{SP}/2 < t_x < t_2 + T_{SP}/2 \qquad (13)$$

The different effect of partial overlap (in the case of section b of FIG. 5) and full collisions (in the case of section c) on detection or LLR calculation is not within the scope of the present invention. Embodiments deal with the question how the L-1 distances $t_{l,(l+1)}$ between the centers (e.g. burst centers) of all L sub-data packets (e.g. bursts) of a hopping pattern (e.g. hopping sequence) have to be chosen so that at most only two sub-data packets overlap at one time, if a second asynchronous participant uses the same hopping pattern.

Since in a synchronous network the sub-data packets either do not overlap at all or overlap completely, a time slot, which corresponds to the duration of a sub-data packet, can be regarded here as the basic unit. If no sub-data packet is sent in a time slot, this corresponds to a zero, "0", in one of the binary sequences described above; in the case of a one, "1", a sub-data packet is emitted by a participant. A finer resolution is not necessary.

Due to the granularity of asynchronous networks, the symbol duration $T_S$ is typically used there as the smallest unit. Two sub-packets can meet and overlap in $2X_{SP}-1$ different symbol positions according to eq. (12). For the definition of a collision used here, it does not matter whether the two sub-data packets are in contact only in one symbol interval, or whether they overlap completely. Any kind of contact is counted as a hit.

Figure 6:
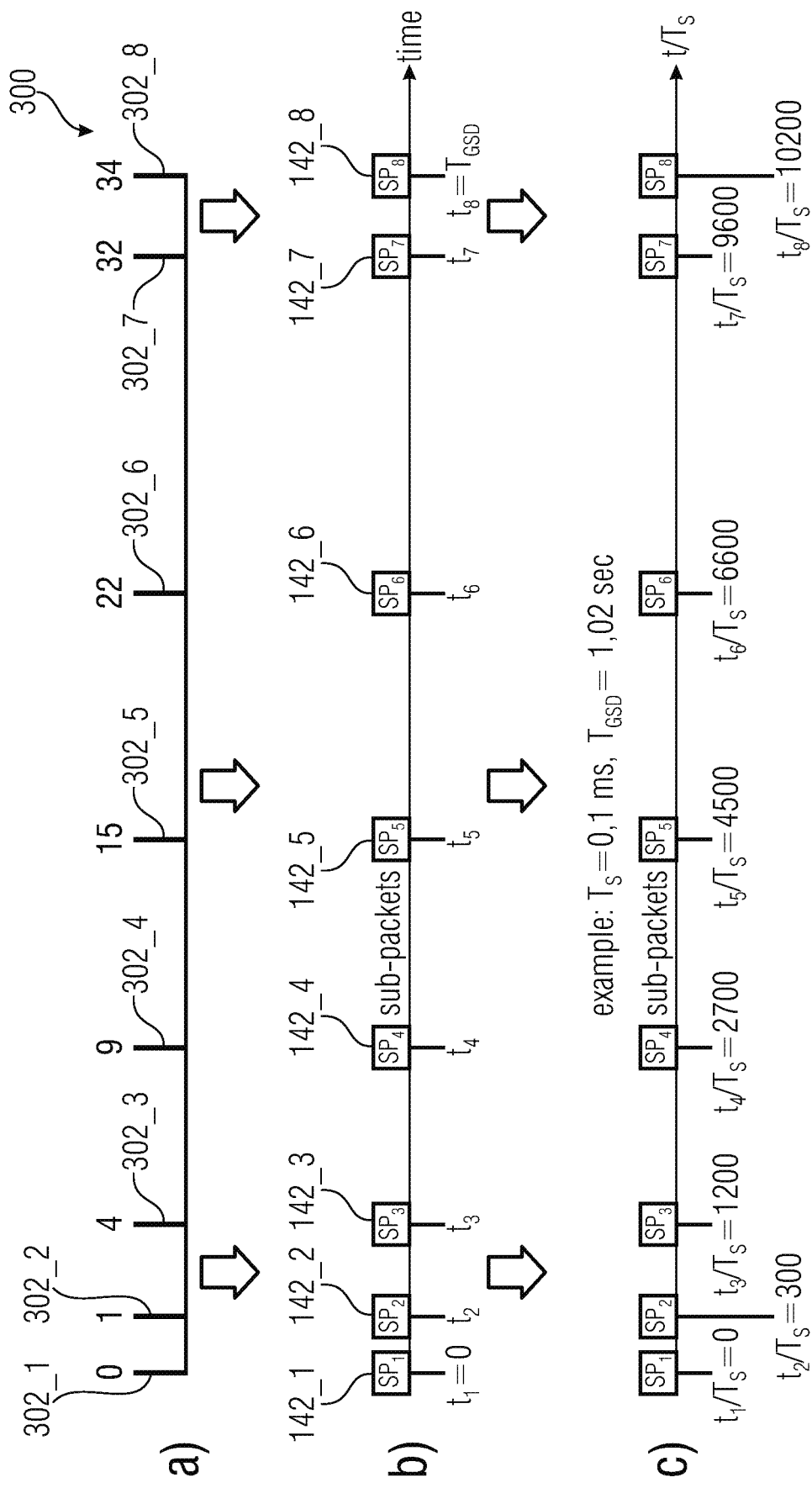
FIG. 6 shows a schematic diagram of a correlation of the Golomb marks of a Golomb ruler and the transmission frame with L sub-data packets, taking into account the symbol and transmission duration.

Consider the optimal Golomb ruler $G_3$ 300 shown in section a of FIG. 6 with order E=8 and the following marks 302_1-302_8:

$$G_3 = \{0,1,4,9,15,22,32,34\}. \qquad (14)$$

According to section b of FIG. 6, each of the eight marks 302_1-302_8 characterizes the middle of a sub-data packet 142_1-142_8 on the time axis, with the mark 302_1 of the first sub-data packet 142_1 being at the time stamp $t_1=0$ and the center of the last sub-data packet 142_8 being at the end of the total transmission time $t_8=T_{GSD}$ of the complete telegram. (Strictly speaking, for the total transmission time, the duration of a sub-data packet would have to be added to $T_{GSD}$; for reasons of simplification, however, only the calculation from the middle of the sub-data packet to the middle of the sub-data packet is used here). Because of the start time at $t_1=0$, it is advantageous to let the first mark 302_1 subsequently always start at zero, 0. Since, as mentioned above (where the marks always started with a one, 1), parallel shifts are trivial operations with no effect on the ACF or CCF, such a shift can be easily performed. In the final step of section c of FIG. 6, the normalization to the symbol duration $T_S$ is performed.

In order to make the further calculation more descriptive, but without limiting the generality, the values given in section c of FIG. 6 of $T_S=0.1$ ms and $T_{GSD}=1020$ ms are used below as an example of the symbol duration and the total transmission duration. As can be seen, the total duration of the transmission of L sub-data packets extends over $Y_{GSD}=10200$ symbols with $$Y_{GSD}=T_{GSD}/T_S. \quad (15)$$

This results in a multiplicative factor of exemplary F=300 between the individual mark numberings and the corresponding number of symbols within the transmission duration, e.g. 34*300=10200.

To ensure simultaneous overlapping of no more than two sub-data packets for two participants both using the hopping pattern according to section c of FIG. 6, the procedure described below can be used according to embodiments.

As already explained at the beginning, an order of E=8 results in a total of $\Sigma_{e=1}^{7}e=28$ different mark distances. In increasing order, for the Golomb ruler $G_3$ 300 from eq. (14), this results in a difference number series of $$\text{Diff}_{G_3}=\{1,2,3,4,5,6,7,8,9,10,11,12,13,14,15,17,18,19,\\21,22,23,25,28,30,31,32,33,34\} \quad (16)$$

for the distances of all mark combinations. The smallest distance of one, 1, (or 300 if the mapping with $T_{GSD}/T_S$ according to FIG. 6c is considered) is between the first and second marks 302_1 and 302_2 (0 and 1) and the largest distance of 34 (or 10200) is between the first and last marks 302_1 and 302_8 (0 and 34). Since there are only 28 distances and the largest distance value is 34, six difference values (these are {16,20,24,26,27,29}) are missing. If the differences are then calculated again from the values of Eq. (16), but only those of the directly neighbors in descending neighborhood (i.e. 2-1, 3-2, 4-3, etc.), the result is a difference sequence of differences with 27 values:

$$\text{Diff}_{\text{Diff}_{G_3}} = \quad (17)$$

$\{1, 1, 1, 1, 1, 1, 1, 1, 1, 1, 1, 1, 1, 2, 1, 1, 2, 3, 2, 1, 1, 1, 1\}.$

Figure 7:
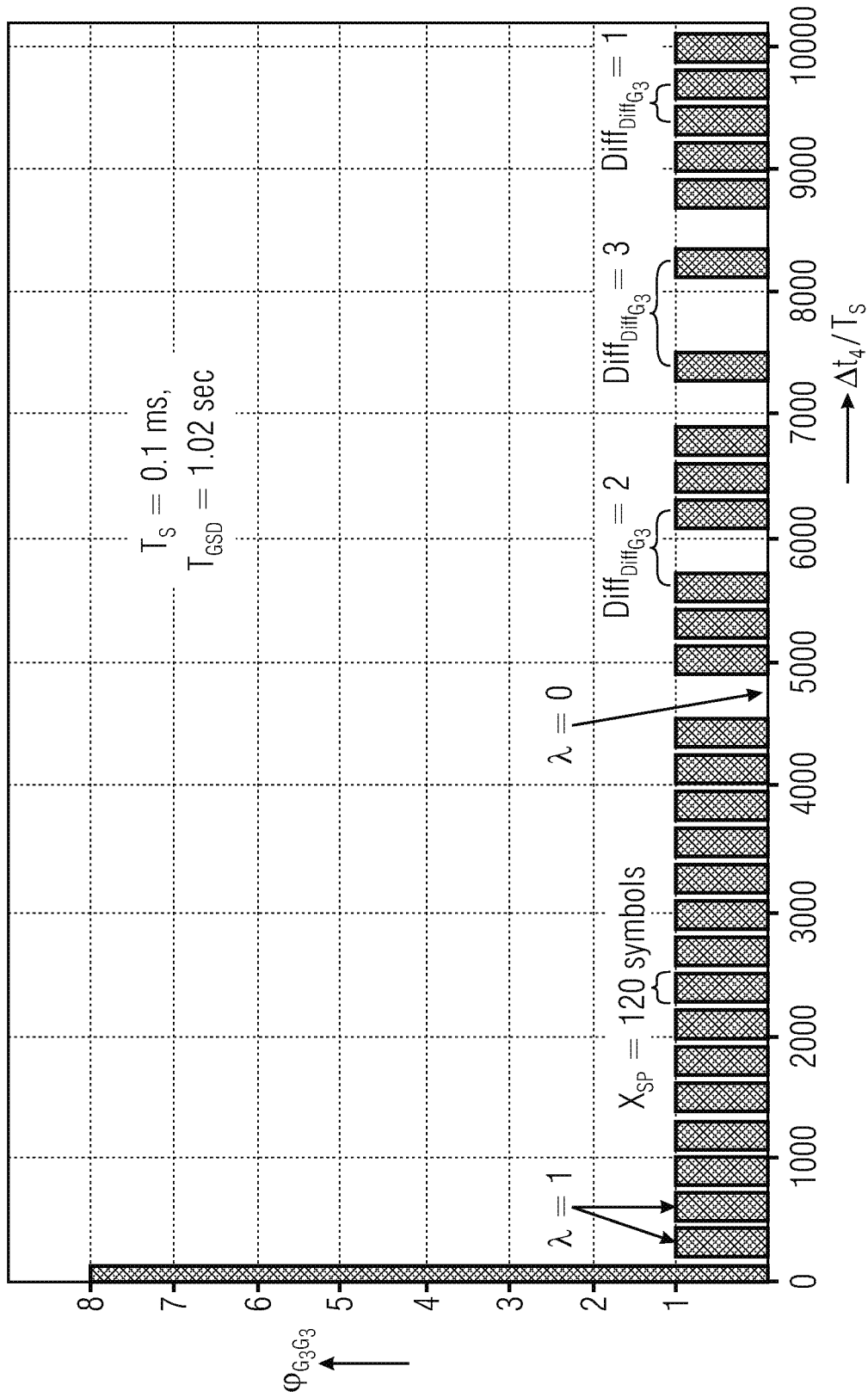
FIG. 7 shows an autocorrelation function of the hopping pattern of FIG. 6 with a sub-data packet length of $X_{SP}$=120 symbols and a frame duration of 1020 ms in a diagram.

This difference sequence according to Eq. (17) corresponds exactly to the distances of the ACF side values with $\lambda=1$ as can be seen in FIG. 7. In detail, FIG. 7 shows an autocorrelation function of the hopping pattern of FIG. 6c with a sub-data packet length of $X_{SP}=120$ symbols in a diagram.

Since six difference values are missing in Eq. (16), there are six ACF side values with $\lambda=0$ and at these points larger distance values ({2,2,2,3,2}) are visible in eq. (17). Since the ACF is axisymmetric, FIG. 7 shows only the right half of the ACF. For a so called thumbtack ACF, the value $E^2$ results for the entire ACF area according to Eq. (4). Reduced to the right half (and without the main maximum at $\varphi(0)$), $(E^2-E)/2$ results, which at E=8 results in a value of 28 side maximums with $\lambda=1$.

In embodiments, generating (e.g. designing) a hopping pattern and determining a maximum sub-data packet length while fulfilling the requirement that at most two sub-data packets from two participants overlap may be performed based on the following steps:

1) Selection of a binary unipolar and non-periodic sequence of order L=E and length N as a hopping pattern, whose ACF has only side values with $\lambda<1$. All the distances (as in Eq. (16), for example) between all mark combinations occur only once. This is the case for all (optimal) Golomb rulers and Barker sequences.

2) By the selection of symbol duration $T_S$ and total send duration $T_{GSD}$, $Y_{GSD}=T_{GSD}/T_S$ symbols result in the transmission interval, resulting in a symbol number factor of $$F=Y_{GSD}/N \quad (18)$$

Using this multiplicative factor and the minimum distance value from Eq. (17), a rule for the maximum allowed number of symbols in a single sub-data packet is obtained:

$$2 * X_{SP} < \min\left(\text{Diff}_{\text{Diff}_{G_3}}\right) * F, \quad (19)$$

so that $\lambda \leq 1$ applies for the ACF side values.

For the example in FIG. 6, F=300 and, according to Eq. (17), this results in $$\min\left(\text{Diff}_{\text{Diff}_{G_3}}\right) = 1.$$

For the maximum length of a sub-data packet, this results in a maximum length of $X_{SP}$ of maximum 150 symbols. In FIG. 7, for example, $X_{SP}=120$ was chosen. From a sub-data packet length of 150 symbols on, the bars of the side maximums would overlap each other. The same applies to the left-hand side in FIG. 6c. The distance between first and second mark 302_1 and 302_2 is 300 symbols. Half of both sub-data packets protrude into this area. The sub-data packet of a second participant (e.g. user) with $X_{SP}>150$ could then hit both sub-data packets of the first participant at the same time, resulting in $\lambda=2$.

Perfect Golomb rulers (PGR) have the densest possible packing density because of the ACF property that only side values with $\lambda=1$ occur. Since these binary sequences have the lowest N at a given order, this results in the longest possible duration per sub-data packet at a given transmission interval $T_{GSD}$. However, these PGRs exist only up to an order of E=4. For larger orders, the optimal Golomb rulers (OGR) take over this property of the longest possible sub-data packets.

In embodiments, (optimal) Golomb rulers or Barker sequences are mapped to a hopping pattern, taking into account symbol and transmission duration. The boundary conditions (eq. (16-19)) concerning the sub-data packet length are specified so that the one-dimensional ACF of this hopping pattern has only side values $\lambda<1$.

Accordingly, in embodiments, the data transmitter 100_1 shown in FIG. 1 may be configured to derive the hopping pattern 142 from a unipolar binary sequence (based, for example, on a Golomb ruler or Barker sequence), wherein
- a minimum total emission duration within which the plurality of sub-data packets are emitted, and/or
- a maximum length of the sub-data packets is/are dependent on a minimum value of a difference sequence of a sorted difference number series derived from the binary sequence, e.g. such that autocorrelation side maximums of an autocorrelation function of the emission of the plurality of sub-data packets have the same maximum value as the autocorrelation side maximums of the autocorrelation function of the binary sequence, or e.g. such that autocorrelation side values of an autocorrelation function of the hopping pattern assume values of one at most.

Accordingly, in embodiments, the data receiver 110 shown in FIG. 1 may be configured to derive the hopping pattern 142 from a unipolar binary sequence (based, for example, on a Golomb ruler or Barker sequence), wherein
- a minimum total emission duration within which the plurality of sub-data packets are emitted, and/or
- a maximum length of the sub data packets is/are dependent on a minimum value of a difference sequence of a sorted difference number series derived from the binary sequence, e.g. such that autocorrelation side maximums of an autocorrelation function of the emission of the plurality of sub-data packets have the same maximum value as the autocorrelation side maximums of the autocorrelation function of the binary sequence, or e.g. such that autocorrelation side values of an autocorrelation function of the hopping pattern assume values of one at most.

2. Group of Several Hopping Patterns With Good ACF and CCF Properties in Asynchronous Transmission The embodiments described in Section 1 refer exclusively to the consideration of a single hopping pattern (e.g. hopping sequence). To reduce the probability of full collisions, multiple (different) hopping patterns can be used. A full collision occurs when two participants (e.g. users) use the same hopping pattern (e.g. hopping sequence) at the same start time and frequency, independently of each other. Despite telegram splitting, all L sub-data packets of the two participants would overlap and interfere with each other. If K different hopping patterns are used, the probability of full collisions can be reduced by a factor of 1/K. Advantageously, not only all K autocorrelations then exhibit good correlation properties, but also all different permutations of all cross-correlation variations.

Purely theoretically, it should be possible to use, in addition to $G_3$ (see eq. (14)), another Golomb ruler $G_4$ with AC side values of $\lambda \leq 1$, wherein the CCF of both sequences should also only have correlation values of $\lambda \leq 1$. For example, the sequence mirrored relative to $G_3$ with the marks $$G_4 = \{0,2,12,19,25,30,33,34\} \quad (20)$$

should have an ACF identical to FIG. 7. The cross-correlation of $G_3$ and $G_4$, however, yields many correlation values with $\lambda=2$ although the CCF with its length of 67 tabs (width: 2N−1) would provide enough space for the 64 possible CCF side values (number: $E^2$) with $\lambda=1$. Presumably, a different ruler length (this corresponds to the last one mark) would have to be allowed, and/or different total transmission durations would have to be allowed so that all correlation values of the resulting CCF would satisfy the value with $\lambda \leq 1$. Exact theoretical considerations about this are not known according to [7] or [8].

However, a second degree of freedom is still available when designing the hopping patterns. In section 1, only one transmission/reception frequency was assumed as an example. Usually, a whole group of frequency channels is available to the data transmitter or data receiver. For example, consider the group of three Golomb rulers given in eq. (21):

$$G_5 = \begin{Bmatrix} 0, 1000, 2140, 3420, 4840, 6400, 8100, 9940 \\ 0, 1840, 3120, 4540, 5540, 6680, 8380, 9940 \\ 0, 1560, 2840, 3840, 5540, 7380, 8800, 9940 \end{Bmatrix}. \quad (21)$$

The common length N with 9940 (symbols) was exemplarily selected so that, including the sub-data packet length with $X_{SP}$ (symbols), a total transmission duration $T_{GSD}$ of about 1000 ms results, if the symbol duration amounts to $T_S=0.1$ ms. The symbol number factor F from Eq. (18) accordingly is F=1 for the 3×8 marks in Eq. (21). The minimum value of the difference sequence of all 3×27 possible differences (see Eqs. (16), (17) and (19)) is a minimum of 121 symbols, which results in a maximum length of a sub-data packet of $X_{SP}$ of a maximum of 60 symbols. Since the Golomb rulers given in eq. (21) are not "optimal Golomb rulers", the maximum sub-data packet length is lower here, as a comparison with the value $X_{SP}=150$ for $G_3$ (Eq. (14)) and $G_4$ (Eq. (20)) shows.

If a single receive frequency is assumed, then the three autocorrelation functions always have side values of $\lambda \leq 1$, provided that according to Eq. (19) the maximum sub-data packet length is limited to $X_{SP} < 60$ symbols. However, for the three cross-correlations, side values occur which often take maximum values up to $\lambda = 3$.

Figure 8:
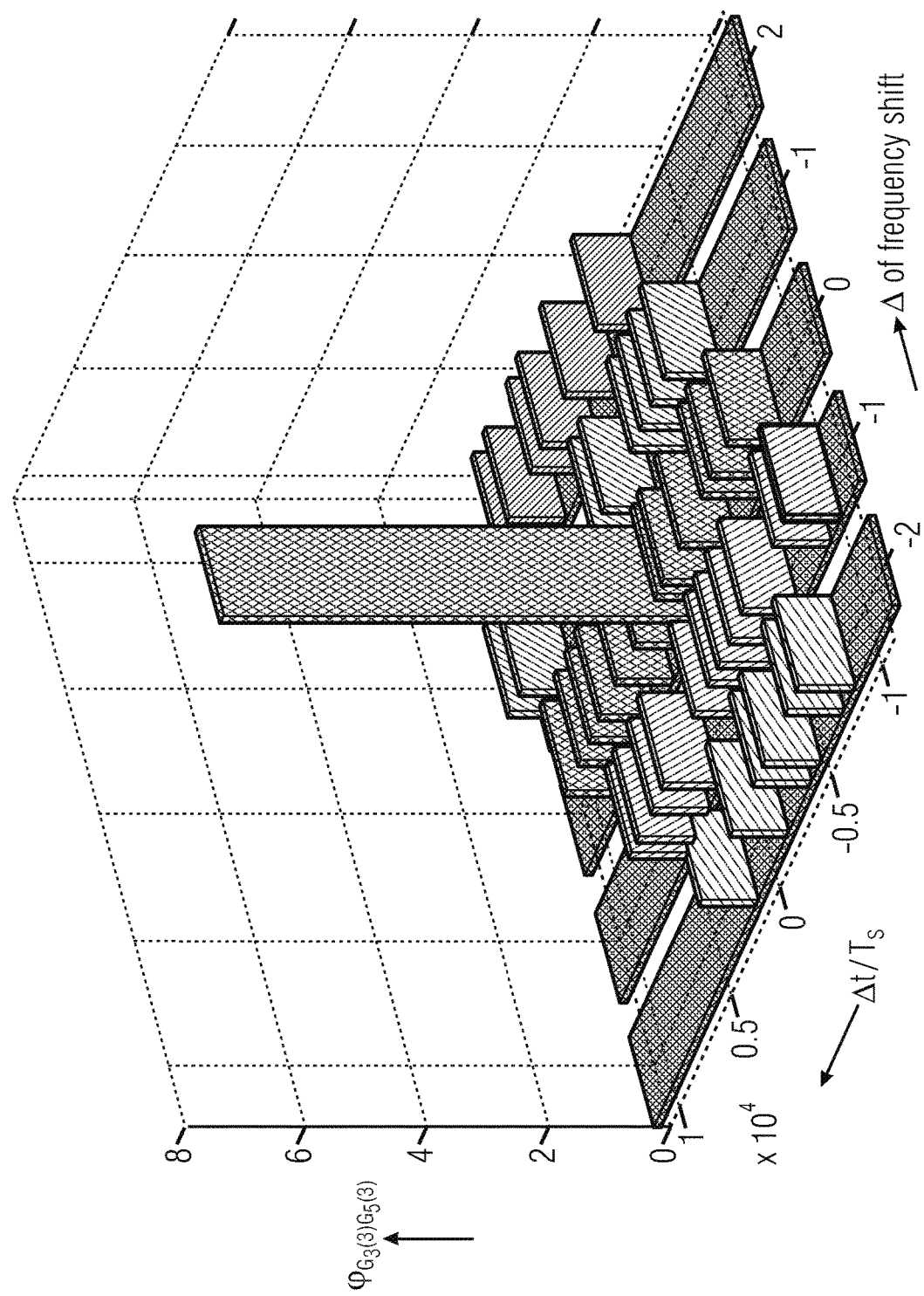
FIG. 8 shows a two-dimensional (thumbtack) autocorrelation function (ACF) of the Golomb ruler $G_5(3)$ with frequency channel occupancy $C_5(3)$ and a sub-data packet length of $X_{SP}$=60 symbols in a diagram.

In the next step, C=3 different frequency channels are assumed and distributed according to the association $$C_5 = \begin{Bmatrix} 0, 0, 1, 1, 2, 0, 2, 1 \\ 1, 1, 2, 0, 2, 2, 0, 1 \\ 1, 0, 2, 0, 0, 2, 2, 1 \end{Bmatrix} \quad (22)$$

wherein the frequency channels numbered 0, 1 and 2 should occur equally often. All three 2D autocorrelation functions still have 56 side values each with $\lambda \leq 1$, illustrated exemplary in FIG. 8 for the two-dimensional ACF of $G_5(3) = \{0, 1560, 2840, 3840, 5540, 7380, 8800, 9940\}$ and the frequency occupancy $C_5(3) = \{1,0,2,0,0,2,2,1\}$. In detail, FIG. 8 shows a two-dimensional thumbtack ACF of the Golomb ruler $G_5(3)$ with frequency channel occupancy $C_5(3)$ and $X_{SP}=60$ in a diagram.

Figure 9:
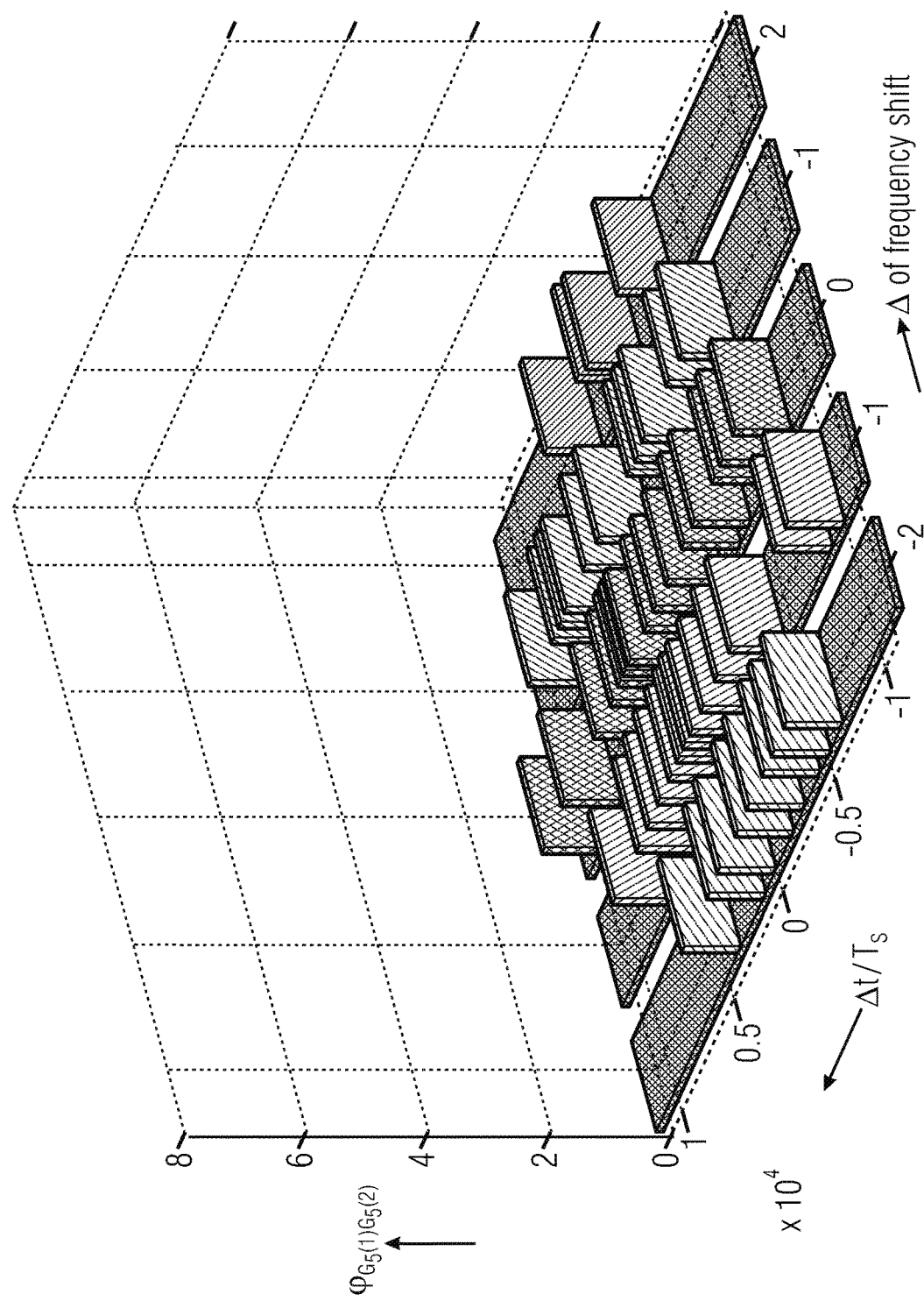
FIG. 9 shows a two-dimensional (thumbtack) cross-correlation function (CCF) of $G_5(1)$ and $G_5(2)$ with the frequency channel occupancies $C_5(1)$ and $C_5(2)$ and $X_{SP}$=60 in a diagram.

Of the three two-dimensional cross-correlations, two cross-correlation functions show ideal correlation behavior, such as that shown in FIG. 9 for the combination of $G_5(1)$ and $G_5(2)$. All 64 occurring side maximums have a value of $\lambda=1$. Only in the case of the CCF of $G_5(2)$ and $G_5(3)$, only one of the side maximums has a value of $\lambda=2$, all other side maximums have values of $\lambda=1$. Despite extensive simulations, no triple combination of hopping patterns could be found for this given sub-data packet length of $X_{SP}=60$ symbols, which, when only three frequency channels are given, always show an ideal ACF and CCF behavior with exclusive side values of $\lambda=1$. In this example, this should only be possible when four frequency channels are used.

One more remark on the origin of the different marks of the three Golomb rulers from Eq. (21).

The differences $\text{Diff}_{G_5}$={1000, 1140, 1280, 1420, 1560, 1700, 1840} of the seven directly adjacent marks are always the same and only have a different order. These differences can be scrambled differently and then added up accordingly. Only the difference-difference test according to Eq. (17) is performed, since there are good and bad combinations in this respect.

In embodiments, generating (e.g. designing) a group of hopping patterns with improved ACF and/or CCF properties may be performed based on one or more of the following steps:

1) Selection of a binary unipolar and non-periodic Golomb linear sequence of order L=E and length N as a starting point for determining the hopping patterns (e.g. channel access patterns). Calculation of the L-1 distances of directly adjacent marks and subsequent permutation of these distances in order to obtain S»K different distance sequences. The L marks of the individual hopping patterns results from continuous addition (cumulative sum) of the different permuted differences. The first mark is always at zero, 0.

2) Testing the S»K hopping patterns by calculating the complete difference number series $\text{Diff}_G$ according to eq. (16) and forming the difference sequence of the differences $\text{Diff}_{\text{Diff}_G}$ according to eq. (17) from the difference number series $\text{Diff}_G$ according to eq. (16). For all S hopping patterns, the minimum $$\min\left(\text{Diff}_{\text{Diff}_{G_3}}\right)$$

is determined from the difference sequence according to Eq. (17). From this sequence of S minimums, those K hopping patterns are then selected whose minimums assume the largest value:

$$\max_K\left(\min_S\left(\text{Diff}_{\text{Diff}_{G_3}}\right)\right).$$

The lowest value of these K maximums indirectly determines the maximum sub-data packet length $X_{SP}$ according to eq. (19).

3) Taking into account the desired symbol duration $T_S$ and specification of the total transmission duration $T_{GSD}$, with $Y_{GSD}=T_{GSD}/T_S$, results in the total number of symbols available in the frame. This results in the symbol number factor with $F=Y_{GSD}/N$ according to Eq. (18). With the factor F, the initial dimensionless length N of the original Golomb or Barker sequences is adapted to the symbol duration and, in particular, to the total transmission duration. Step 3 with the consideration of F can also take place already before step 1 and be considered immediately with the initial Golomb or Barker sequences. This results in greater degrees of freedom in the definition of the individual marks.

4) If the sub-data packet length resulting from steps 1 to 3 $X_{SP}$ is too small, step 1 can be returned to to repeat steps 1 to 3 with another unipolar and non-periodic sequence of order L=E and the same length until reaching the desired number of K hopping patterns with sufficiently large $X_{SP}$. All K hopping patterns then have a one-dimensional ACF with side values of $\lambda\leq1$, as long as the partial data packet length threshold is not exceeded. Design steps 1 to 3 all occur on a single reception frequency.

5) In the fifth step, the frequency channel number C is included to obtain good cross-correlation properties with allowed side values of $\lambda\leq1$ for all $\Sigma_{k=1}^{K-1}k$ permutations of the cross-correlations. To make this possible, the following rule of thumb can advantageously be fulfilled for the frequency number C:

$$C\geq\text{floor}(1.9*K). \quad (23)$$

According to the L sub-data packets per hopping pattern (e.g. hopping sequence), if the calls of the K hopping patterns (e.g. hopping sequences) are assumed to be equally distributed, the C different frequency channels are passed through L*K in total. Often there is the additional requirement that the frequency channels should be equally distributed on average so that (L*K)/C results in an integer.

6) After fixing on a value of C, any association scheme for the respective L frequency calls is chosen for the first two hopping patterns. In case of L≤C, each frequency should be used only once according to any random pattern (see table 1), and in case of L>C, then the randomly generated multiple calls of the frequencies should also be distributed over L as evenly as possible. The order of the individual frequencies in the call pattern can be permuted until the first CCF for these two hopping frequencies has the required property with side values of $\lambda<1$. It is then proceeded accordingly with the third and each further up to K following hopping sequence. Since 2 additional CCFs are to be optimized regarding the side values with the third hopping sequence already, many call patterns should be canceled with the first CCF combination so that with one of these patterns also the second CCF calculation has only side values with $\lambda\leq1$. For the last K-th hopping sequence, things are most complicated since all K−1 different CCFs are to be optimized here with one frequency pattern.

7) If all $\Sigma_{k=1}^{K-1}k$ CCF permutations have side values with $\lambda\leq1$, then the group of hopping patterns can be considered ideal with respect to their ACF and CCF properties. If not, the optimization process can be restarted with a repeated restart of step 5 and a different frequency association. If this does not succeed in spite of many repetitions, then, if possible, the number of frequency channels should be increased, or as few side values with $\lambda=2$ as possible are allowed.

A specific embodiment of a sequence $G_6$ will be described below where the following values are assumed.

Number of sub-data packets: L=E=8

Number of hopping patterns: K=6

Number of frequencies: C=24, evenly distributed over three step patterns each

Symbol duration: $T_S$=0,0525128 ms

Frame duration: $T_{GSD}$~1 s (corresponds to 19043 symbols)

Sub-data packet length in symbols: $X_{SP}$=108 symbols

The following is the basic Golomb ruler assumed: $G_6$={0, 1904, 4075, 7579, 10816, 13520, 15979, 18950} where the difference sequence $\text{Diff}_{G_6}$={1904, 2171, 2459, 2704, 2971, 3237, 3504} of the seven directly adjacent marks (each corresponding to the center of a sub-data packet) of $G_6$ can be permuted in such a way that the six different hopping patterns according to tables 1a and 1b are obtained. In both tables, instead of the absolute mark position, the difference of the sub-data packet centers is always specified. The minimum difference $$\min\left(\mathit{Diff}_{\mathit{Diff}_{G_3}}\right)$$

according to Eq. (17) is 245 symbols, which easily allows a required sub-data packet length of 108 symbols.

TABLE 1a

Time position of the first three hopping patterns of $G_6$ for a frame duration of 1 s Difference to a respective immediately preceding hop in multiples of $T_S$

| No. | 1 | 2 | 3 | 4 | 5 | 6 | 7 |
|---|---|---|---|---|---|---|---|
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 |

TABLE 1b

Time position of the second three hopping patterns of $G_6$ for a frame duration of 1 s Difference to a respective immediately preceding hop in multiples of $T_S$

| No. | 1 | 2 | 3 | 4 | 5 | 6 | 7 |
|---|---|---|---|---|---|---|---|
| 4 | 1904 | 2171 | 2459 | 2704 | 2971 | 3237 | 3504 |
| 5 | 3504 | 2459 | 2704 | 1904 | 2171 | 3237 | 2971 |
| 6 | 3504 | 2171 | 2704 | 1904 | 3237 | 2971 | 2459 |

If the individual sub-data packets of the six hop patterns are assigned to the frequency channels numbered from 0 to 23, according to the specifications of tables 2a and 2b, exclusively side values of $\lambda \leq 1$ result for all six two-dimensional autocorrelation functions as well as the 15 different two-dimensional cross-correlation functions.

TABLE 2a

Frequency position of the three different hopping patterns of $G_6$ from Table 1a for a frame duration of 1 s Frequency channel numbers of the individual hops

| No. | 1 | 2 | 3 | 4 | 5 | 6 | 7 | 8 |
|---|---|---|---|---|---|---|---|---|
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 |

TABLE 2b

Frequency position of the three different hopping patterns of $G_6$ from Table 1b for a frame duration of 1 s Frequency channel numbers of the individual hops

| No. | 1 | 2 | 3 | 4 | 5 | 6 | 7 | 8 |
|---|---|---|---|---|---|---|---|---|
| 4 | 0 | 9 | 18 | 3 | 12 | 21 | 6 | 15 |
| 5 | 4 | 10 | 22 | 16 | 7 | 19 | 13 | 1 |
| 6 | 23 | 14 | 17 | 8 | 20 | 11 | 5 | 2 |

In embodiments, one of the embodiments described in Section 1 may be extended to a group of K hopping patterns whose two-dimensional autocorrelation or cross-correlation sequences all have exclusively side values of $\lambda \leq 1$. Another degree of freedom added here is the number C of available frequencies.

In embodiments, a data transmitter, e.g., the data transmitter shown in FIG. 1, may be configured to emit a signal (e.g. having eight sub-data packets) in correspondence with a hopping pattern, wherein the hopping pattern is a time hopping pattern, a frequency hopping pattern, or a combination of the time hopping pattern and the frequency hopping pattern, wherein the time hopping pattern is one of the time hopping patterns shown in Tables 1a and 1b, each having eight hops, and wherein the frequency hopping pattern is one of the frequency hopping patterns shown in Tables 2a and 2b, each having eight hops.

In embodiments, a data transmitter, e.g. the data receiver 110 shown in FIG. 1, may be configured to receive a signal (e.g. having eight sub-data packets) transmitted in correspondence with a hopping pattern, wherein the hopping pattern is a time hopping pattern, a frequency hopping pattern, or a combination of the time hopping pattern and the frequency hopping pattern, wherein the time hopping pattern is one of the time hopping patterns mentioned in Tables 1a and 1b, each having eight hops, and wherein the frequency hopping pattern is one of the frequency hopping patterns mentioned in Tables 2a and 2b, each having eight hops.

3. Group of Several Hopping Patterns With ACF and CCF Side Values of $\lambda \leq 2$ With Asynchronous Transmission The conditions described below ensure that a one-dimensional ACF has only side values of $\lambda \leq 1$:

1) The larger the number of sub-data packets L (or order E), the disproportionately larger the length N, see Eq. (6), or FIG. 4. For example, for L=8, N=34 is sufficient, whereas for L=24, N=425 is used.
2) The shorter the desired total transmission duration $T_{GSD}$ for a given symbol duration $T_S$, the lower the total number of symbols $Y_{GSD}$ available in the frame.
3) As a result, the symbol number factor $F=Y_{GSD}/N$ becomes smaller and smaller, and as a result the allowed sub-data packet length $X_{SP}$ becomes smaller and smaller so that, with the 1D-ACF, the side maximums keep the required values. $\lambda \leq 1$.

For example, if, for $G_6$, the frame duration $T_{GSD}$ was shortened from 1 s to 0.25 s, the maximum possible sub-data packet length would be reduced to 30 symbols. With the optimum Golomb ruler $G_3$, it would be only 37 symbols.

Figure 10:
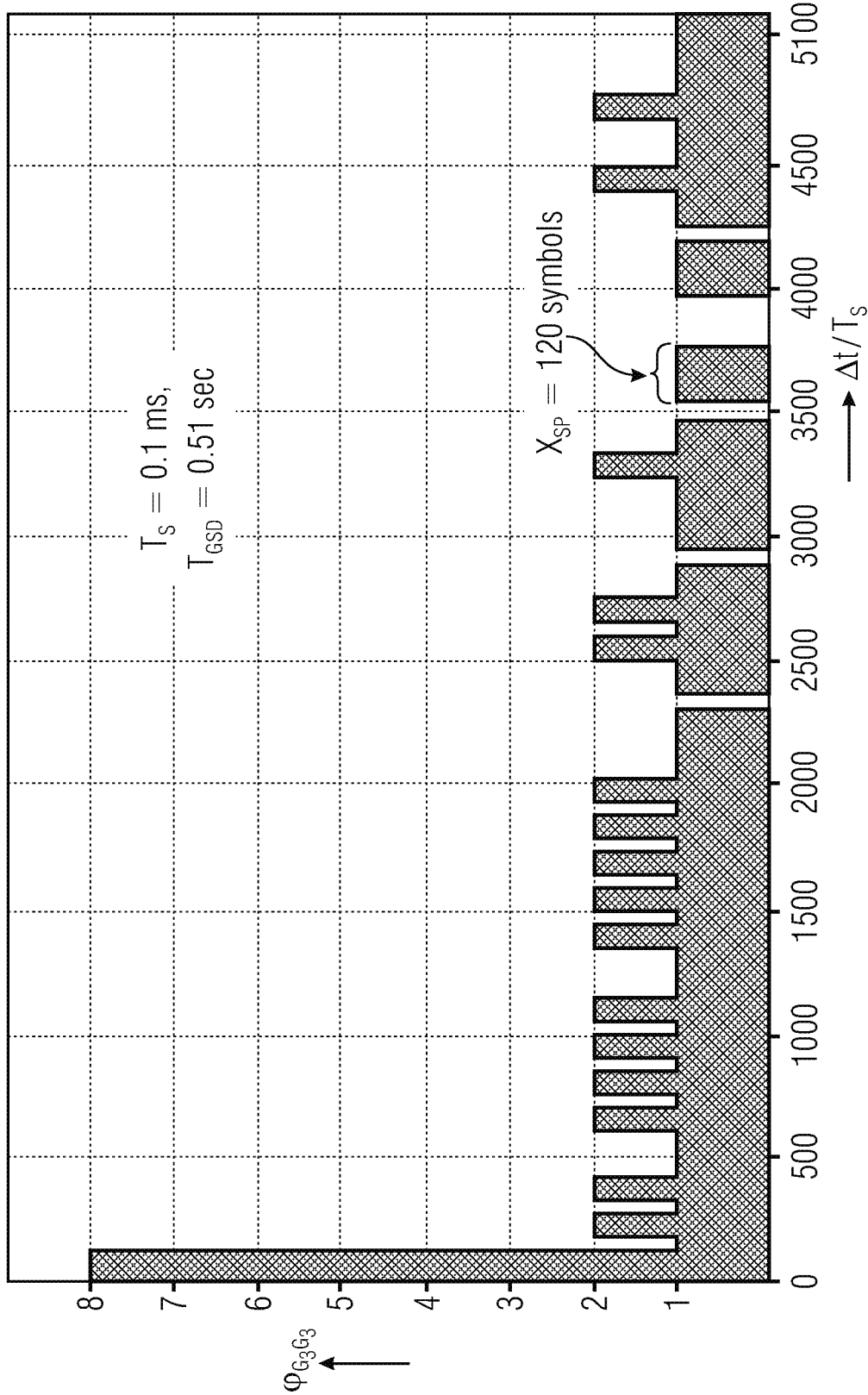
FIG. 10 shows a one-dimensional autocorrelation function of the hopping pattern $G_3$ (eq. (14)) with halved frame duration ($T_{GSD}$=510 ms) compared to FIG. 7 in a diagram.

However, if a larger sub-data packet length $X_{SP}$ is used, then larger side values than one, 1, occur with the one-dimensional ACF. This is illustrated by the example of the "optimal Golomb ruler" $G_3$ from Eq. (14). If a shorter total transmission duration of $T_{GSD}$=510 ms is specified, then only 5100 symbols result for the total duration. For the maximum length of a sub-data packet, this results (see eq. (19)) in $X_{SP}$ of at most 75 symbols. If a larger sub-data packet length of, e.g., 120 symbols is selected, then—figuratively speaking—the bars of the side maximums become wider and begin to overlap. As shown in FIG. 10, the side maximums in these overlapping areas then increase to values of =2.

The "(optimal) Golomb rulers" or "Barker sequences" again behave optimally with respect to the increasing side maximums. Accordingly, eq. (19), which was valid for ACF side values $\lambda \leq 1$, can be generalized:

$$(2 * X_{SP}/T) < \min\left(\text{Diff}_{\text{Diff}_{G_3}}\right) * F. \quad (24)$$

If ACF side values are allowed for which generally $\lambda \leq T$ is to apply, then sub-data packet lengths which are greater by exactly this factor T than for $\lambda \leq 1$ can be permitted.

Especially if the side values of the one-dimensional ACF have values with $\lambda \geq 1$, it can be achieved by a correspondingly large presetting of frequency channels that the side values of the two-dimensional ACF have smaller values with then again $\lambda \leq 1$.

Embodiments allow, with Eq. (24), in dependence on the influencing variables order E of the Golomb ruler, its length N, the total transmission duration $T_{GSD}$ and the symbol duration $T_S$, together with eqs. (15) to (18), an estimation for the maximum values $\lambda \leq T$ of the side maximums which can occur in the one-dimensional ACF. To reduce these maximum values in the two-dimensional ACF (e.g. $\lambda \leq 1$), the number of frequency channels C can be selected in such a way that they do not fall below the following value, if possible:

$$C \geq \text{floor}(1.5 * T * K). \quad (25)$$

In the following, a specific embodiment of a sequence $G_7$ is describes, wherein the following values are assumed.

Number of sub-data packets: L=E=8

Number of hopping patterns: K=3

Number of frequencies: C=24, evenly distributed over the three hopping patterns

Symbol duration: $T_S$=0,0525128 ms

Frame duration: $T_{GSD}$~0.25 s (corresponds to 4738 symbols)

Sub-data packet length in symbols: $X_{SP}$=108 Symbols.

Side condition: improved (e.g. good) CCF properties with $G_6$

The one-dimensional ACF of an optimal Golomb ruler, for this short frame duration, would have side maximum values of up to $\lambda$=4. If the three hopping patterns were optimized for the given number of 24 frequencies, side values with $\lambda \leq 1$ could be forced with all correlation variations. However, since the six hopping patterns of $G_6$ are additionally included in the optimization, new hopping patterns with nine two-dimensional autocorrelation functions and 36 cross-correlation functions result. The joint design results in 42 perfect correlation functions with side values of $\lambda \leq 1$ and three cross-correlation functions with a total of five side values of $\lambda$=2. The time as well as frequency positions of the three hopping patterns for $G_7$ are shown in Tables 3 and 4.

TABLE 3

Time position of the three different hopping patterns of $G_7$ for a frame duration of 0.25 s Difference to a respective immediately preceding hop in multiples of $T_S$

| No. | 1 | 2 | 3 | 4 | 5 | 6 | 7 |
|---|---|---|---|---|---|---|---|
| 1 | 756 | 688 | 823 | 892 | 621 | 552 | 406 |
| 2 | 553 | 484 | 756 | 892 | 823 | 688 | 542 |
| 3 | 877 | 744 | 809 | 477 | 543 | 677 | 611 |

TABLE 4

Frequency position of the three different hopping patterns of $G_7$ for a frame duration of 0.25 s Frequency channel numbers of the individual hops

| No. | 1 | 2 | 3 | 4 | 5 | 6 | 7 | 8 |
|---|---|---|---|---|---|---|---|---|
| 1 | 1 | 8 | 14 | 22 | 17 | 5 | 12 | 3 |
| 2 | 18 | 4 | 9 | 13 | 15 | 11 | 20 | 0 |
| 3 | 23 | 19 | 16 | 6 | 2 | 10 | 21 | 7 |

In embodiments, any of the embodiments described in Section 2 may be extended to hopping patterns whose 1D-ACF has side values with $\lambda$>1. Again, the "(optimal) Golomb rulers" or Barker sequences prove to be optimal. The disentanglement, that the 2D autocorrelation functions and cross-correlation functions again exclusively have side values of $\lambda \leq 1$, can be done over a larger number of available frequencies.

In embodiments, a data transmitter, e.g. the data transmitter shown in FIG. 1, may be configured to emit a signal (e.g. having eight sub-data packets) in correspondence with a hopping pattern, wherein the hopping pattern is a time hopping pattern, a frequency hopping pattern, or a combination of the time hopping pattern and the frequency hopping pattern, wherein the time hopping pattern is one of the time hopping patterns listed in Table 3, each having eight hops, and wherein the frequency hopping pattern is one of the frequency hopping patterns listed in Table 4, each having eight hops.

In embodiments, a data transmitter, e.g. the data receiver 110 shown in FIG. 1, may be configured to receive a signal (e.g. having eight sub-data packets) transmitted in correspondence with a hopping pattern, wherein the hopping pattern is a time hopping pattern, a frequency hopping pattern, or a combination of the time hopping pattern and the frequency hopping pattern, wherein the time hopping pattern is one of the time hopping patterns shown in Table 4, each having eight hops, and wherein the frequency hopping pattern is one of the frequency hopping patterns shown in Table 4, each having eight hops.

4. Use of Hopping Patterns According to Sections 2 and 3 with ETSI TS 103 357 [9] Modification In [9], a communication system is shown which uses TSMA to transmit data in both uplink and downlink.

However, only very small data rates with a maximum of 2380.371 sym/s are specified in [9]. If the data rate is to be increased, the transmission duration of the sub-data packets is reduced and thus also the active time of the (data) transmitter. This allows a reduction in power consumption for battery-powered transmitters. Likewise, the pauses between the sub-data packets are also reduced, since all information are given in symbol durations. This is shown in more detail using the following example:

Specified data rate according to [9]: 2380.371 sym/s
Sub-data packet duration according to [9]: 15.1 ms
Telegram duration (core frame) according to [9]: approx. 3.7 s
New desired data rate: 19042.968 sym/s (corresponds to 8*2380.371 sym/s)
New partial data packet duration: 1.89 ms
New telegram duration (core frame) when using the hopping pattern according to [9]: approx. 0.46 s As can be seen from the example, the duration of a sub-data packet as well as the duration of the telegram is reduced by the same factor as the data rate is scaled when using the hopping patterns defined in [9].

Since the data transmitter (e.g. terminal, such as sensor node) typically goes into sleep mode between sub-data packets to save power, it first waits a certain amount of time for the crystal to settle after waking up, before starting transmission.

This time is typically in the range of a few milliseconds so the overhead in the system from [9] only comes into play slightly.

However, if the data rate is increased by a factor of eight, as shown in the example, this overhead takes on a much larger factor. This reduces the transmission time by a factor of eight, but not the active time of the sensor node. This means that a reduction in power consumption is only possible to a small extent.

The embodiments described below allow the hopping patterns in [9] to be substituted for higher data rates for those described in Sections 2 and/or 3.

In [9], a total of 24 sub-data packets with a size of 36 symbols each are transmitted in a so-called core frame. These 24 sub-data packets are mapped to 24 frequency channels by means of the hopping patterns defined there.

If three sub-data packets are transmitted in such a way that the times between the sub-data packets correspond exactly to the duration of a sub-data packet and if the same frequency channel is selected for all three sub-data packets, this corresponds to a continuous emission, wherein the three sub-data packets then correspond to a new larger sub-data packet with three times the duration. If this is applied to the 24 sub-data packets of the core frame, the result is eight new sub-data packets, each now comprising 108 symbols. The hopping patterns from sections 2 and/or 3 can be ideally used for this purpose.

Since there are now only eight sub-data packets with three times the duration in the data transmitter instead of 24, the sensor node only has to wake up from sleep mode eight times instead of 24 and wait until the crystal has settled, which reduces the power consumption per telegram sent significantly.

In the data receiver, the signal processing can continue to be performed on the original 24 sub-data packets, since the pilot sequences (training sequence, mid-amble, pre-amble, synchronization sequence) are still included in all three combined sub-data packets. Thus, there is also a simple adaptation (only adaptation of the hopping patterns during correlation) in the receiver.

In embodiments, three sub-data packets of an uplink message from the core frame according to [9] each may be temporally concatenated and transmitted at the same frequency.

5. Further Embodiments

Figure 11:
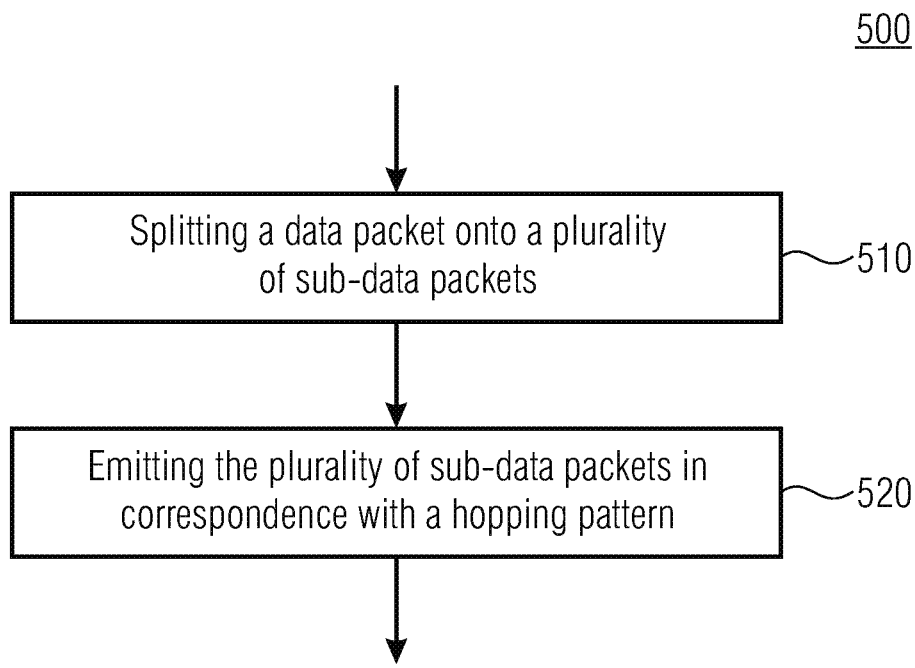
FIG. 11 shows a flowchart of a method for transmitting a data packet in a communication system.

FIG. 11 illustrates a flowchart of a method 500 for transmitting a data packet in a communication system, the communication system communicating wirelessly in a frequency band used for communication by a plurality of communication systems. The method 500 comprises a step of splitting 510 a data packet into a plurality of sub-data packets. Furthermore, the method 500 comprises a step of emitting 520 the plurality of sub-data packets in correspondence with a hopping pattern [e.g. time hopping pattern and/or frequency hopping pattern], wherein the hopping pattern is derived from a binary sequence, wherein an autocorrelation function of the binary sequence has autocorrelation side maximums with a predetermined maximum value [e.g. $\lambda=1$ or $\lambda=2$], wherein a minimum total emission duration within which the plurality of sub-data packets are transmitted, and/or a maximum length of the sub-data packets is/are dependent on a minimum value of a difference sequence of a sorted difference number series derived from the binary sequence [e.g. such that autocorrelation side maximums of an autocorrelation function of the emission of the plurality of sub-data packets have the same maximum value as the autocorrelation side maximums of the autocorrelation function of the binary sequence].

Figure 12:
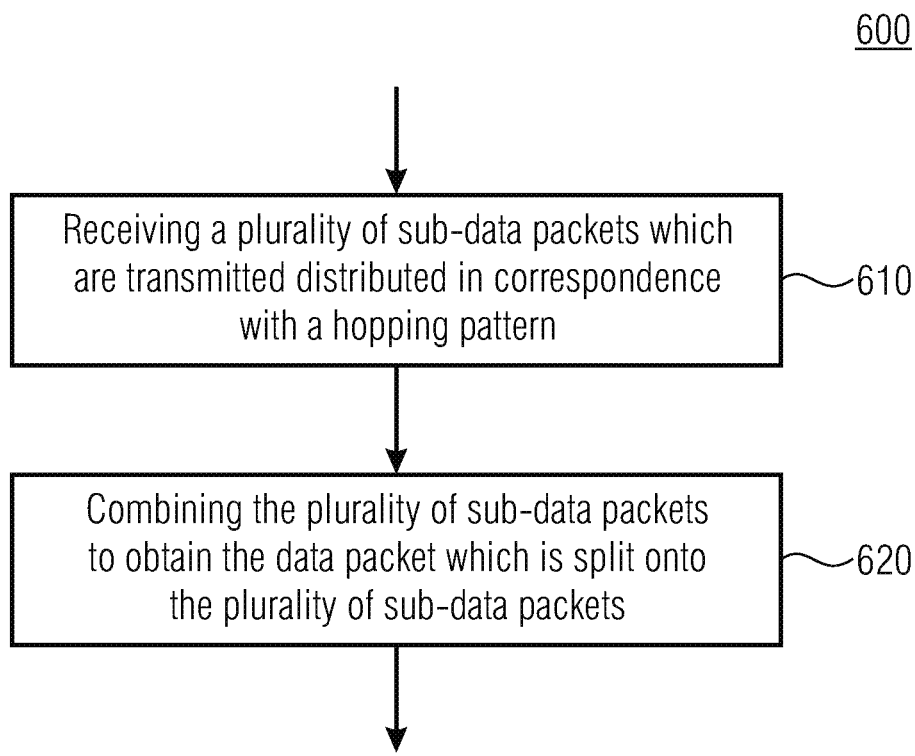
FIG. 12 shows a flowchart of a method for receiving a data packet in a communication system.

FIG. 12 illustrates a flowchart of a method 600 for receiving a data packet in a communication system, the communication system communicating wirelessly in a frequency band used for communication by a plurality of communication systems. The method 600 comprises a step 610 of receiving a plurality of sub-data packets transmitted distributed in correspondence with a hopping pattern. Furthermore, the method 600 comprises a step of combining 620 the plurality of sub-data packets to obtain the data packet split onto the plurality of sub-data packets, wherein the hopping pattern is derived from a binary sequence, wherein an autocorrelation function of the binary sequence has autocorrelation side maximums with a predetermined maximum value [e.g. $\lambda=1$ or $\lambda=2$], wherein a minimum total emission duration within which the plurality of sub-data packets are transmitted and/or a maximum length of the sub-data packets depend/s on a minimum value of a difference sequence of a sorted difference number series derived from the binary sequence [e.g. such that autocorrelation side maximums of an autocorrelation function of the emission of the plurality of sub-data packets have the same maximum value as the autocorrelation side maximums of the autocorrelation function of the binary sequence].

Figure 13:
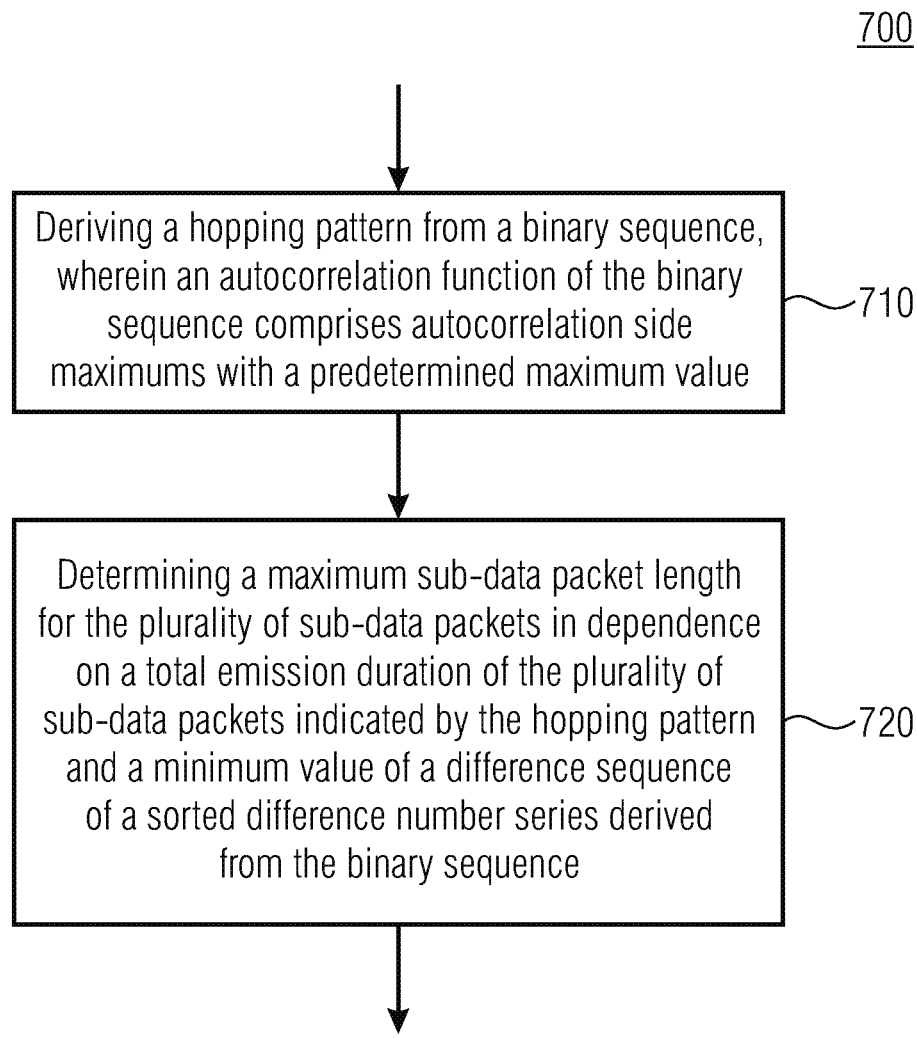
FIG. 13 shows a flowchart of a method for generating a hopping pattern for transmitting a plurality of sub-data packets in a communication system.

FIG. 13 illustrates a flowchart of a method 700 for generating a hopping pattern for transmitting a plurality of sub-data packets in a communication system. The method 700 comprises a step of deriving 710 a hopping pattern from a binary sequence, wherein an autocorrelation function of the binary sequence comprises autocorrelation side maximums with a predetermined maximum value [e.g. $\lambda=1$ or $\lambda=2$]. Furthermore, the method 700 comprises a step of determining 720 a maximum sub-data packet length [e.g. temporal length, like number of symbols] for the plurality of sub-data packets depending on a total emission duration of the plurality of sub-data packets indicated by the hopping pattern and a minimum value of a difference sequence of a sorted difference number series derived from the binary sequence [e.g. such that autocorrelation side maximums of an autocorrelation function of the emission of the plurality of sub-data packets in correspondence with the hopping pattern have the same maximum value as the autocorrelation side maximums of the autocorrelation function of the binary sequence].

Figure 14:
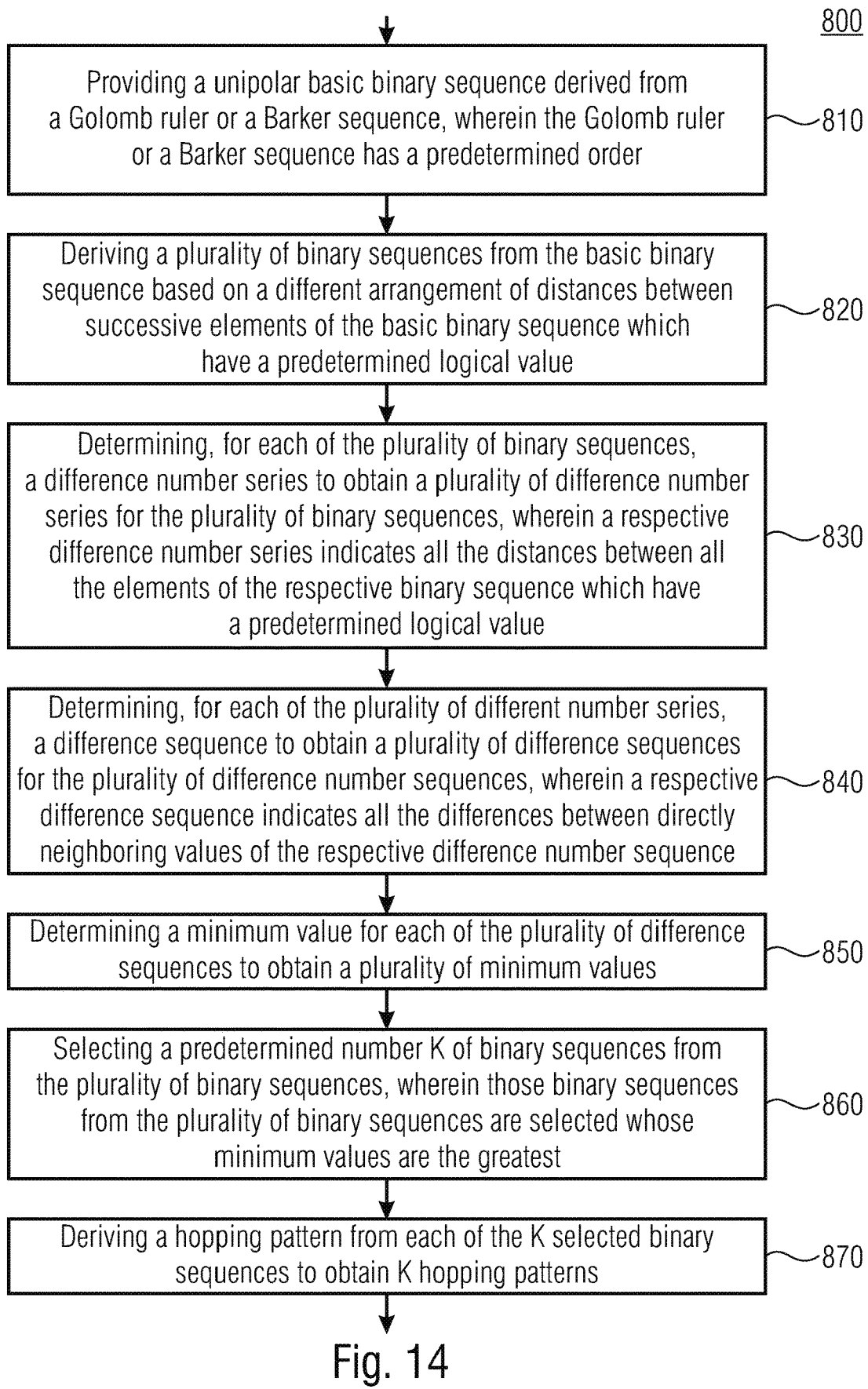
FIG. 14 shows a flowchart of a method for generating (K) hopping patterns with predetermined autocorrelation features.

FIG. 14 illustrates a flowchart of a method 800 for generating (K) hopping patterns with predetermined autocorrelation properties [e.g. and predetermined cross-correlation properties]. The method 800 comprises a step 810 of providing a unipolar basic binary sequence derived from a Golomb ruler or Barker sequence, the Golomb ruler or Barker sequence having a predetermined order (E) [e.g. and a predetermined length L(=E)]. The method 800 further comprises a step 820 of deriving a plurality of binary sequences from the basic binary sequence based on a different arrangement of distances between successive elements of the basic binary sequence having a predetermined logical value [e.g. a first logical value, such as logic one, 1]. The method 800 further comprises a step of determining 830, for each of the plurality of binary sequences, a difference number series to obtain a plurality of difference number series for the plurality of binary sequences, wherein a respective difference number series indicates all the distances between all the elements [e.g. digits] of the respective binary sequence having a predetermined logical value [e.g. a first logical value, such as logic one, 1]. The method 800 further comprises a step of determining 840, for each of the plurality of difference number series, a difference sequence to obtain a plurality of difference sequences for the plurality of difference number series, wherein a respective difference sequence indicates all the differences between immediate neighboring values of the respective difference number series. The method 800 further comprises a step of determining 850 a minimum value for each of the plurality of difference sequences to obtain a plurality of minimum values. The method 800 further comprises a step of selecting 860 a predetermined number K of binary sequences from the plurality of binary sequences, wherein those binary sequences are selected from the plurality of binary sequences whose minimum values are the largest. The method 800 further comprises a step 870 of deriving a hopping pattern from each of the K selected binary sequences to obtain K hopping patterns.

Embodiments of the present invention provide unipolar aperiodic binary sequences with improved (e.g. good) correlation properties. Improved (e.g. good) correlation properties are characterized by a maximized main-side maximum ratio. Since the ACF main maximum in unipolar binary sequences always equals the order E, the above requirement corresponds to minimum ACF side values of $\lambda \in \{0,1\}$. Optimal Golomb rulers or Barker sequences are characterized by exactly these properties.

In embodiments, starting from such sequences (i.e. optimal Golomb rulers or Barker sequences), a mapping to a hopping pattern may be made taking into account symbol and transmission durations. Embodiments describe boundary conditions which allow a certain sub-packet length so that the one-dimensional ACF of the hopping pattern has only side values of $\lambda \leq 1$.

Embodiments can be extended to a group of K hopping patterns whose two-dimensional autocorrelation or cross-correlation sequences all exclusively have side values of $\lambda \leq 1$ if the number C of available frequencies is added as a further degree of freedom.

In embodiments, for hopping patterns whose 1D-ACF have side values with $\lambda > 1$, (optimal) Golomb rulers or Barker sequences can also be used. The disentanglement that the 2D autocorrelation functions and cross-correlation functions again exclusively have side values of $\lambda \leq 1$, is done over a larger number of available frequencies.

Embodiments of the present invention are applied in systems for radio transmission of data from many terminals to a base station and/or from one or more base stations to terminals. Depending on the application, this may involve unidirectional or bidirectional data transmission. Embodiments can be used particularly advantageously in systems in which an encoded message (data packet) is transmitted in several sub-data packets (or partial data packets) which are smaller than the actual information (i.e. the encoded message (data packet)) to be transmitted (the so-called telegram splitting multiple access (TSMA) method, see, for example, [1], [2], [3]). A telegram (i.e. the encoded message (data packet)) is split into several sub-data packets. In the telegram splitting method, the L sub-data packets are transmitted on one frequency or distributed over several frequencies. Between the L sub-data packets, there are temporal pauses in which no transmission takes place, wherein the pauses can differ in their temporal lengths in multiples of the symbol duration. The sequence of emissions of the sub-data packets in time and frequency is referred to as channel access pattern or hopping pattern.

The telegram splitting approach provides particularly high robustness against interference from other data transmitters (e.g. sensor nodes), regardless of whether they come from the user's own system or from third-party systems. The robustness to interference from the own data transmitters (e.g. sensor nodes) is achieved in particular by distributing the different sub-data packets as uniformly as possible over both the time and frequency domains. This random-like distribution is achieved by a different burst arrangement of the different data transmitters (e.g. sensor nodes) in different hopping patterns.

Embodiments of the present invention relate to the design and optimization of such hopping patterns in networks with asynchronous transmission.

Although some aspects have been described in the context of an apparatus, it is understood that these aspects also represent a description of the corresponding method so that a block or component of an apparatus is also to be understood to be a corresponding method step or feature of a method step. In analogy, aspects described in connection with or as a method step also represent a description of a corresponding block or detail or feature of a corresponding apparatus. Some or all of the method steps may be performed by (or using) a hardware apparatus, such as a microprocessor, a programmable computer, or an electronic circuit. In some embodiments, some or more of the most important method steps may be performed by such an apparatus.

Depending on particular implementation requirements, embodiments of the invention may be implemented in hardware or in software. The implementation may be performed using a digital storage medium, for example a floppy disk, a DVD, Blu-ray disc, CD, ROM, PROM, EPROM, EEPROM, or FLASH memory, a hard disk, or any other magnetic or optical storage which has stored thereon electronically readable control signals which can or do interact with a programmable computer system so as to perform the respective method. Therefore, the digital storage medium may be computer-readable.

Thus, some embodiments according to the invention include a data carrier having electronically readable control signals capable of cooperating with a programmable computer system such that any of the methods described herein is performed.

Generally, embodiments of the present invention may be implemented as a computer program product having program code, the program code being operative to perform any of the methods when the computer program product runs on a computer.

For example, the program code may also be stored on a machine-readable carrier.

Other embodiments include the computer program for performing any of the methods described herein, wherein the computer program is stored on a machine-readable carrier.

In other words, an embodiment of the inventive method is thus a computer program comprising program code for performing any of the methods described herein when the computer program runs on a computer.

Thus, another embodiment of the inventive methods is a data carrier (or digital storage medium or computer-readable medium) on which the computer program for performing any of the methods described herein is recorded. The data carrier, digital storage medium, or computer-readable medium is typically tangible and/or non-transitory or non-transient.

Thus, a further embodiment of the inventive method is a data stream or sequence of signals constituting the computer program for performing any of the methods described herein. The data stream or sequence of signals may, for example, be configured to be transferred via a data communication link, for example via the Internet.

Another embodiment comprises processing means, such as a computer or programmable logic device, configured or adapted to perform any of the methods described herein.

Another embodiment includes a computer having installed thereon the computer program for performing any of the methods described herein.

Another embodiment according to the invention comprises an apparatus or system configured to transmit a computer program for performing at least one of the methods described herein to a receiver. The transmission may, for example, be electronic or optical. The receiver may be, for example, a computer, mobile device, storage device, or similar device. The apparatus or system may include, for example, a file server for transmitting the computer program to the receiver.

In some embodiments, a programmable logic device (for example, a field programmable gate array, FPGA) may be used to perform some or all of the functionalities of the methods described herein. In some embodiments, a field programmable gate array may cooperate with a microprocessor to perform any of the methods described herein. In general, in some embodiments, the methods are performed on the part of any hardware apparatus. This may be general-purpose hardware such as a computer processor (CPU), or hardware specific to the method, such as an ASIC.

The apparatus described herein may be implemented using, for example, a hardware apparatus, or using a computer, or using a combination of a hardware apparatus and a computer.

The apparatus described herein, or any components of the apparatus described herein, may be implemented at least partly in hardware and/or in software (computer program).

For example, the methods described herein may be implemented using a hardware apparatus, or using a computer, or using a combination of a hardware apparatus and a computer.

The methods described herein, or any components of the methods described herein, may be performed at least partly by hardware and/or by software.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ABBREVIATIONS $\lambda$: possible ACF or CCF side values $\lambda \leq \lambda_{max}$
ACF: aperiodic autocorrelation function $\varphi_{ss}(m)$
BS: base station
CRE: common resource elements
E: order (corresponding to number of one marks) of an (a) periodic unipolar binary sequence (usually corresponding to L).
F: symbol number factor: quotient of the number of symbols divided by the length of the Golomb ruler.
MSR: main-to-side maximum ratio (see eq. (5)).
K: number of all hopping patterns available
CCF: non-periodic cross-correlation function $\varphi_{ij}(m)$, i,j=0 (1)K−1, with i≠j.
L: number of partial data packets (sub-packets) into which a message is divided, or number of resource elements of a hopping pattern used for this
LPWAN: Low Power Wide Area Network
M: size of the resource frame with M=T*C, where C are the elements in frequency direction and T are the time slots in time direction
N: length of a Golomb ruler (corresponding to the last one mark)
N: period length of a periodic unipolar binary sequence $\tilde{s}(n) \in \{0,1\}$
OGR: optimal Golomb Ruler, aperiodic binary sequences with elements $\epsilon\{0,1\}$ whose ACF have only side values $\in\{0,1\}$. If there is no shorter length N at the same order E, then they are called "optimal". Otherwise, they are called "non-optimal Golomb rulers" or "Barker sequences".
PACF: periodic autocorrelation function $\varphi_{ss}(m)$
PER: packet error rate
TSMA: Telegram Splitting Multiple Access
$T_S$: symbol duration
$T_{GSD}$: total duration for the transmission of L sub-packets (including all pauses), split into $Y_{GSD}$ symbols: $T_{GSD}=Y_{GSD}*T_S$ ($T_{GSD}$ refers to the burst centers of the first and last sub-packets).
$T_{SP}$: duration of a sub-packet consisting of $X_{SP}$ symbols: $T_{SP}=X_{SP}*T_S$
$T_T$: duration of the "compact" telegram; corresponds to the duration of L sub-packets
$X_{SP}$: length of a sub-packet in symbols
$Y_{GSD}$: total duration in symbols

BIBLIOGRAPHY

[1] DE 10 2011 082 098 B4
[2] G. Kilian, H. Petkov, R. Psiuk, H. Lieske, F. Beer, J. Robert, and A. Heuberger, "Improved coverage for low-power telemetry systems using telegram splitting," in Proceedings of 2013 European Conference on Smart Objects, Systems and Technologies (SmartSysTech), 2013.
[3] G. Kilian, M. Breiling, H. H. Petkov, H. Lieske, F. Beer, J. Robert, and A. Heuberger, "Increasing Transmission Reliability for Telemetry Systems Using Telegram Splitting," IEEE Transactions on Communications, vol. 63, no. 3, pp. 949-961, March 2015.
[4] DE 10 2016 220 882 A1
[5] DE 10 2017 206 236 A1
[6] DE 10 2017 211 375 A1

[7] Hans Dieter Lücke: "Korrelationssignal" (Correlation signal), Springer-Verlag Berlin Heidelberg New York, 1992.
[8] Leonard D. Baumert, "Cyclic difference sets", Springer-Verlag Berlin Heidelberg, 1971.
[9] ETSI TS 103 357, Low Throughput Networks, v.1.1.1, June 2018.

The invention claimed is:

1. A data transmitter of a communication system,
wherein the communication system communicates wirelessly in a frequency band used for communication by a plurality of communication systems,
the data transmitter being configured to split a data packet into a plurality of sub-data packets and to emit the plurality of sub-data packets in correspondence with a hopping pattern,
wherein the hopping pattern is derived from a binary sequence, wherein an autocorrelation function of the binary sequence comprises autocorrelation side maximums with a predetermined maximum value,
wherein a minimum total emission duration within which the plurality of sub-data packets are emitted, and/or a maximum length of the sub-data packets is/are dependent on a minimum value of a difference sequence of a sorted difference number series derived from the binary sequence.

2. The data transmitter in accordance with claim 1, wherein the binary sequence maps, or maps at least partly, a Golomb ruler, a mirrored version of a Golomb ruler or a Barker sequence.

3. The data transmitter in accordance with claim 1, wherein autocorrelation side maximums of an autocorrelation function of the emission of the plurality of sub-data packets comprise the same maximum value as the autocorrelation side maximums of the autocorrelation function of the binary sequence.

4. The data transmitter in accordance with claim 1, wherein one element among
the minimum total emission duration and
the maximum length of the sub-data packets depends on
a symbol duration,
a number of sub-data packets,
the minimum value of the difference sequence of the sorted difference number series, and
the other element among the total emission duration and the length of the sub-data packets.

5. The data transmitter in accordance with claim 1, wherein the dependence of the maximum length $X_{SP}$ of the sub-data packets on the symbol duration $T_S$, the number N of sub-data packets and the total emission duration $T_{GSD}$ is based on the following formula:

$$X_{SP} < \frac{1}{2} \min(\text{Diff}_{\text{Diff}_{G_3}}) \cdot \frac{T_{GSD}}{T_S \cdot N},$$

wherein $\min(\text{Diff}_{\text{Diff}_G})$ describes the minimum value of the difference sequence of the sorted difference number series.

6. The data transmitter in accordance with claim 1, wherein the dependence of the minimum total emission duration $T_{GSD}$ on the symbol duration $T_S$, the number of N of sub-data packets and the maximum length $X_{SP}$ of the sub-data packets is based on the following formula:

$$T_{GSD} > 2 \cdot X_{SP} \frac{1}{\min(\text{Diff}_{\text{Diff}_{G_3}})} \cdot T_S \cdot N,$$

wherein $\min(\text{Diff}_{\text{Diff}_G})$ describes the minimum value of the difference sequence of the sorted difference number series.

7. The data transmitter in accordance with claim 1,
wherein a first logical value of the binary sequence indicates an emission of a sub-data packet,
wherein a second logical value of the binary sequence indicates a transmission pause.

8. A data receiver of a communication system,
wherein the communication system communicates wirelessly in a frequency band used for communication by a plurality of communication systems,
the data receiver being configured to receive a plurality of sub-data packets which are transmitted distributed in correspondence with a hopping pattern, and to combine the plurality of sub-data packets to acquire a data packet split onto the plurality of sub-data packets,
wherein the hopping pattern is derived from a binary sequence, wherein an autocorrelation function of the binary sequence comprises autocorrelation side maximums with a predetermined maximum value,
wherein a minimum total emission duration within which the plurality of sub-data packets are emitted, and/or a maximum length of the sub-data packets is/are dependent on a minimum value of a difference sequence of a sorted difference number series derived from the binary sequence.

9. The data receiver in accordance with claim 8, wherein the binary sequence maps, or maps at least partly, a Golomb ruler, a mirrored version of a Golomb ruler or a Barker sequence.

10. The data receiver in accordance with claim 8, wherein autocorrelation side maximums of an autocorrelation function of the emission of the plurality of sub-data packets comprise the same maximum value as the autocorrelation side maximums of the autocorrelation function of the binary sequence.

11. The data receiver in accordance with claim 8, wherein one element among
the minimum total emission duration and
the maximum length of the sub-data packets depends on
a symbol duration,
a number of sub-data packets,
the minimum value of the difference sequence of the sorted difference number series, and
the other element among the total emission duration and the length of the sub-data packets.

12. The data receiver in accordance with claim 8, wherein the dependence of the maximum length $X_{SP}$ of the sub-data packets on the symbol duration $T_S$, the number N of sub-data packets and the total emission duration $T_{GSD}$ is based on the following formula:

$$X_{SP} < \frac{1}{2} \min(\text{Diff}_{\text{Diff}_{G_3}}) \cdot \frac{T_{GSD}}{T_S \cdot N},$$

wherein $\min(\text{Diff}_{\text{Diff}_G})$ describes the minimum value of the difference sequence of the sorted difference number series.

13. The data receiver in accordance with claim 8,
wherein the dependence of the minimum total emission duration $T_{GSD}$ on the symbol duration $T_S$, the number of N of sub-data packets and the maximum length $X_{SP}$ of the sub-data packets is based on the following formula:

$$T_{GSD} > 2 \cdot X_{SP} \frac{1}{\min\left(\text{Diff}_{\text{Diff}_{G_3}}\right)} \cdot T_S \cdot N,$$

wherein $\min(\text{Diff}_{\text{Diff}_G})$ describes the minimum value of the difference sequence of the sorted difference number series.

14. The data receiver in accordance with claim 8,
wherein a first logical value of the binary sequence indicates an emission of a sub-data packet,
wherein a second logical value of the binary sequence indicates a transmission pause.

15. A data transmitter,
the data transmitter being configured to emit a signal in correspondence with a hopping pattern,
wherein the hopping pattern is a time hopping pattern, a frequency hopping pattern or a combination of the time hopping pattern and the frequency hopping pattern,
wherein the time hopping pattern is one of the nine time hopping patterns, mentioned in the table below, each comprising eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 |
| 4 | 1904 | 2171 | 2459 | 2704 | 2971 | 3237 | 3504 |
| 5 | 3504 | 2459 | 2704 | 1904 | 2171 | 3237 | 2971 |
| 6 | 3504 | 2171 | 2704 | 1904 | 3237 | 2971 | 2459 |
| 7 | 756 | 688 | 823 | 892 | 621 | 552 | 406 |
| 8 | 553 | 484 | 756 | 892 | 823 | 688 | 542 |
| 9 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point of the respective hop to an equal reference point of a directly preceding hop in symbol durations or multiples of symbol durations,
wherein the frequency hopping pattern is one of the nine frequency hopping patterns, mentioned in the table below, each comprising eight hops:

| | Frequency channel numbers of the individual hops | | | | | | | |
|---|---|---|---|---|---|---|---|---|
| No. | 1 | 2 | 3 | 4 | 5 | 6 | 7 | 8 |
| 1 | 23 | 7 | 20 | 14 | 1 | 21 | 15 | 18 |
| 2 | 12 | 16 | 5 | 11 | 19 | 6 | 22 | 4 |
| 3 | 3 | 17 | 0 | 10 | 13 | 9 | 2 | 8 |
| 4 | 0 | 9 | 18 | 3 | 12 | 21 | 6 | 15 |
| 5 | 4 | 10 | 22 | 16 | 7 | 19 | 13 | 1 |
| 6 | 23 | 14 | 17 | 8 | 20 | 11 | 5 | 2 |
| 7 | 1 | 8 | 14 | 22 | 17 | 5 | 12 | 3 |
| 8 | 18 | 4 | 9 | 13 | 15 | 11 | 20 | 0 |
| 9 | 23 | 19 | 16 | 6 | 2 | 10 | 21 | 7 | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

16. The data transmitter in accordance with claim 15,
The data transmitter being configured to emit, by means of the data signal, eight sub-data packets in correspondence with the hopping pattern.

17. The data transmitter in accordance with claim 15,
the data transmitter being configured to provide at least 24 uplink sub-data packets in correspondence with the ETSI TS 103 357 standard,
the data transmitter being configured to combine three of the 24 uplink sub-data packets each to form a long sub-data packet to acquire eight long sub-data packets,
the data transmitter being configured to emit, by means of the data signal, the eight long sub-data packets in correspondence with the hopping pattern.

18. A data receiver,
the data receiver being configured to receive a signal in correspondence with a hopping pattern,
wherein the hopping pattern is a time hopping pattern, a frequency hopping pattern or a combination of the time hopping pattern and the frequency hopping pattern,
wherein the time hopping pattern is one of the nine time hopping patterns, mentioned in the table below, each comprising eight hops:

| | Difference to a respective directly preceding hop in multiples of $T_S$ | | | | | | |
|---|---|---|---|---|---|---|---|
| No. | 1 | 2 | 3 | 4 | 5 | 6 | 7 |
| 1 | 1904 | 2171 | 3504 | 3237 | 2704 | 2459 | 2971 |
| 2 | 2971 | 3504 | 2459 | 1904 | 2704 | 2171 | 3237 |
| 3 | 2971 | 2171 | 2704 | 3504 | 3237 | 2459 | 1904 |
| 4 | 1904 | 2171 | 2459 | 2704 | 2971 | 3237 | 3504 |
| 5 | 3504 | 2459 | 2704 | 1904 | 2171 | 3237 | 2971 |
| 6 | 3504 | 2171 | 2704 | 1904 | 3237 | 2971 | 2459 |
| 7 | 756 | 688 | 823 | 892 | 621 | 552 | 406 |
| 8 | 553 | 484 | 756 | 892 | 823 | 688 | 542 |
| 9 | 877 | 744 | 809 | 477 | 543 | 677 | 611 | wherein, in the table, each line is a time hopping pattern, wherein, in the table, each column is a hop of the respective time hopping pattern starting from a second hop so that each time hopping pattern comprises eight hops, wherein, in the table, each cell specifies a temporal distance of a reference point of the respective hop to an equal reference point of a directly preceding hop in symbol durations or multiples of symbol durations,
wherein the frequency hopping pattern is one of the nine frequency hopping patterns, mentioned in the table below, each comprising eight hops:

|     | Frequency channel numbers of the individual hops |    |    |    |    |    |    |    |
| No. | 1  | 2  | 3  | 4  | 5  | 6  | 7  | 8  |
|-----|----|----|----|----|----|----|----|----|
| 1   | 23 | 7  | 20 | 14 | 1  | 21 | 15 | 18 |
| 2   | 12 | 16 | 5  | 11 | 19 | 6  | 22 | 4  |
| 3   | 3  | 17 | 0  | 10 | 13 | 9  | 2  | 8  |
| 4   | 0  | 9  | 18 | 3  | 12 | 21 | 6  | 15 |
| 5   | 4  | 10 | 22 | 16 | 7  | 19 | 13 | 1  |
| 6   | 23 | 14 | 17 | 8  | 20 | 11 | 5  | 2  |
| 7   | 1  | 8  | 14 | 22 | 17 | 5  | 12 | 3  |
| 8   | 18 | 4  | 9  | 13 | 15 | 11 | 20 | 0  |
| 9   | 23 | 19 | 16 | 6  | 2  | 10 | 21 | 7  | wherein, in the table, each line is a frequency hopping pattern, wherein, in the table, each column is a hop of the respective frequency hopping pattern, wherein, in the table, each cell indicates a frequency channel number of the respective hop of the respective frequency hopping pattern.

19. The data receiver in accordance with claim 18, the data receiver being configured to receive, by means of the data signal, eight sub-data packets in correspondence with the hopping pattern.

20. The data receiver in accordance with claim 18, the data receiver being configured to receive, by means of the data signal, eight long sub-data packets in correspondence with the hopping pattern,
wherein each of the eight long sub-data packets comprises three of 24 uplink sub-data packets in correspondence with the ETSI TS 103 357 standard,
wherein the data receiver is configured to process the eight long sub-data packets to acquire the 24 uplink sub-data packets.

\* \* \* \* \*

UNITED STATES PATENT AND TRADEMARK OFFICE
CERTIFICATE OF CORRECTION

PATENT NO. : 11,881,889 B2
APPLICATION NO. : 17/724790
DATED : January 23, 2024
INVENTOR(S) : Gerd Kilian et al.

It is certified that error appears in the above-identified patent and that said Letters Patent is hereby corrected as shown below:

In the Claims

1. In Claim 5, Column 45, Line 56, please delete the subscripted "3" following "G" in the equation.

2. In Claim 6, Column 46, Line 3, please delete the subscripted "3" following "G" in the equation.

3. In Claim 12, Column 46, Line 62, please delete the subscripted "3" following "G" in the equation.

4. In Claim 13, Column 47, Line 10, please delete the subscripted "3" following "G" in the equation.

Signed and Sealed this
Seventh Day of May, 2024

Katherine Kelly Vidal
*Director of the United States Patent and Trademark Office*